US010270599B2

(12) United States Patent
Nadeau et al.

(10) Patent No.: US 10,270,599 B2
(45) Date of Patent: Apr. 23, 2019

(54) DATA REPRODUCIBILITY USING BLOCKCHAINS

(71) Applicant: Factom, Austin, TX (US)

(72) Inventors: Jason Nadeau, Missouri City, TX (US);
Brian Deery, Austin, TX (US);
Mahesh Paolini-Subramanya, Austin, TX (US); Paul Snow, Austin, TX (US)

(73) Assignee: Factom, Inc., Austin, TX (US)

( * ) Notice: Subject to any disclaimer, the term of this patent is extended or adjusted under 35 U.S.C. 154(b) by 166 days.

(21) Appl. No.: 15/499,558

(22) Filed: Apr. 27, 2017

(65) Prior Publication Data
US 2018/0316502 A1    Nov. 1, 2018

(51) Int. Cl.
| | |
|---|---|
| *H04W 12/06* | (2009.01) |
| *H04L 29/06* | (2006.01) |
| *H04L 9/32* | (2006.01) |
| *H04L 9/06* | (2006.01) |
| *G06N 20/00* | (2019.01) |

(52) U.S. Cl.
CPC ........... *H04L 9/3236* (2013.01); *G06N 20/00* (2019.01); *H04L 9/0637* (2013.01); *H04L 9/0643* (2013.01); *H04L 9/3247* (2013.01)

(58) Field of Classification Search
CPC ............ H04L 9/32; H04L 9/06; G06N 99/005
See application file for complete search history.

(56) References Cited

U.S. PATENT DOCUMENTS

| | | | |
|---|---|---|---|
| 4,309,569 | A | 6/1982 | Merkle |
| 5,499,294 | A | 3/1996 | Friedman |
| (Continued) | | | |

FOREIGN PATENT DOCUMENTS

| | | |
|---|---|---|
| DE | 10128728 | 1/2003 |
| JP | 5383297 | 1/2014 |
| (Continued) | | |

OTHER PUBLICATIONS

Brendan McMahan, "Federated Learning: Collaborative machine learning without centralized training data", Apr. 6, 2017, pp. 1-11.*

(Continued)

*Primary Examiner* — Wasika Nipa
(74) *Attorney, Agent, or Firm* — Scott P. Zimmerman, PLLC

(57) ABSTRACT

Data verification in federate learning is faster and simpler. As artificial intelligence grows in usage, data verification is needed to prove custody and/or control. Electronic data representing an original version of training data may be hashed to generate one or more digital signatures. The digital signatures may then be incorporated into one or more blockchains for historical documentation. Any auditor may then quickly verify and/or reproduce the training data using the digital signatures. For example, a current version of the training data may be hashed and compared to the digital signatures generated from the current version of the training data. If the digital signatures match, then the training data has not changed since its creation. However, if the digital signatures do not match, then the training data has changed since its creation. The auditor may thus flag the training data for additional investigation and scrutiny.

16 Claims, 28 Drawing Sheets

(56) References Cited

U.S. PATENT DOCUMENTS

| | | | |
|---|---|---|---|
| 5,862,218 | A | 1/1999 | Steinberg |
| 5,966,446 | A | 10/1999 | Davis |
| 7,572,179 | B2 | 8/2009 | Choi et al. |
| 7,729,950 | B2 | 6/2010 | Mendizabal et al. |
| 8,245,038 | B2 | 8/2012 | Golle et al. |
| 8,266,439 | B2 | 9/2012 | Haber et al. |
| 8,442,903 | B2 | 5/2013 | Zadoorian et al. |
| 8,560,722 | B2 | 10/2013 | Gates et al. |
| 8,706,616 | B1 | 4/2014 | Flynn |
| 8,712,887 | B2 | 4/2014 | DeGroeve et al. |
| 8,867,741 | B2 | 10/2014 | McCorkindale et al. |
| 8,943,332 | B2 | 1/2015 | Horne et al. |
| 9,124,423 | B2 | 9/2015 | Jennas, II et al. |
| 9,396,006 | B2 | 7/2016 | Kundu et al. |
| 9,407,431 | B2 | 8/2016 | Bellare et al. |
| 9,411,524 | B2 | 8/2016 | O'Hare et al. |
| 9,411,976 | B2 | 8/2016 | Irvine |
| 9,411,982 | B1 | 8/2016 | Dippenaar et al. |
| 9,424,576 | B2 | 8/2016 | Vandervort |
| 9,436,935 | B2 | 9/2016 | Hudon |
| 9,472,069 | B2 | 10/2016 | Roskowski |
| 9,489,827 | B2 | 11/2016 | Quinn et al. |
| 9,584,493 | B1* | 2/2017 | Leavy .................. H04L 63/104 |
| 9,722,790 | B2 | 8/2017 | Ebrahimi |
| 9,876,646 | B2 | 1/2018 | Ebrahimi |
| 9,882,918 | B1 | 1/2018 | Ford et al. |
| 2003/0018563 | A1 | 1/2003 | Kilgour et al. |
| 2004/0085445 | A1 | 5/2004 | Park |
| 2005/0206741 | A1 | 9/2005 | Raber |
| 2006/0075228 | A1 | 4/2006 | Black et al. |
| 2006/0184443 | A1 | 8/2006 | Erez et al. |
| 2007/0094272 | A1 | 4/2007 | Yeh |
| 2007/0296817 | A1 | 12/2007 | Ebrahimi et al. |
| 2008/0010466 | A1 | 1/2008 | Hopper |
| 2009/0025063 | A1 | 1/2009 | Thomas |
| 2009/0287597 | A1 | 11/2009 | Bahar |
| 2010/0049966 | A1 | 2/2010 | Kato |
| 2010/0058476 | A1 | 3/2010 | Isoda |
| 2010/0161459 | A1 | 6/2010 | Kass et al. |
| 2010/0241537 | A1 | 9/2010 | Kass et al. |
| 2013/0222587 | A1 | 8/2013 | Roskowski |
| 2014/0229738 | A1 | 8/2014 | Sato |
| 2014/0344015 | A1 | 11/2014 | Puertolas-Montasnes et al. |
| 2016/0071096 | A1 | 3/2016 | Rosca |
| 2016/0119134 | A1 | 4/2016 | Hakoda et al. |
| 2016/0148198 | A1 | 5/2016 | Kelley |
| 2016/0162897 | A1 | 6/2016 | Feeney |
| 2016/0217436 | A1 | 7/2016 | Brama |
| 2016/0253663 | A1 | 9/2016 | Clark et al. |
| 2016/0260091 | A1 | 9/2016 | Tobias |
| 2016/0267472 | A1 | 9/2016 | Lingham et al. |
| 2016/0267558 | A1 | 9/2016 | Bonnell et al. |
| 2016/0275294 | A1 | 9/2016 | Irvine |
| 2016/0283920 | A1* | 9/2016 | Fisher .................. G06Q 20/065 |
| 2016/0292396 | A1 | 10/2016 | Akerwall |
| 2016/0292672 | A1 | 10/2016 | Fay et al. |
| 2016/0292680 | A1 | 10/2016 | Wilson, Jr. et al. |
| 2016/0300200 | A1 | 10/2016 | Brown et al. |
| 2016/0300234 | A1 | 10/2016 | Moss-Pultz et al. |
| 2016/0321675 | A1 | 11/2016 | McCoy et al. |
| 2016/0321751 | A1 | 11/2016 | Creighton, IV et al. |
| 2016/0328791 | A1 | 11/2016 | Parsells et al. |
| 2016/0330031 | A1 | 11/2016 | Drego et al. |
| 2016/0330244 | A1 | 11/2016 | Denton |
| 2016/0337119 | A1 | 11/2016 | Hosaka et al. |
| 2016/0342977 | A1 | 11/2016 | Lam |
| 2016/0342989 | A1 | 11/2016 | Davis |
| 2016/0344737 | A1 | 11/2016 | Anton et al. |
| 2017/0005797 | A1* | 1/2017 | Lanc ..................... H04L 9/0894 |
| 2017/0053249 | A1 | 2/2017 | Tunnell et al. |
| 2017/0061396 | A1 | 3/2017 | Melika et al. |
| 2017/0124534 | A1 | 5/2017 | Savolainen |
| 2017/0124535 | A1 | 5/2017 | Juels et al. |
| 2017/0177898 | A1 | 6/2017 | Dillenberger |
| 2017/0213287 | A1 | 7/2017 | Bruno |
| 2017/0243208 | A1 | 8/2017 | Kurian et al. |
| 2017/0243289 | A1 | 8/2017 | Rufo |
| 2017/0244757 | A1 | 8/2017 | Castinado et al. |
| 2017/0330279 | A1 | 11/2017 | Ponzone |
| 2017/0352031 | A1 | 12/2017 | Collin |
| 2017/0373859 | A1 | 12/2017 | Shors et al. |
| 2018/0075527 | A1 | 3/2018 | Nagla et al. |
| 2018/0091524 | A1 | 3/2018 | Setty |
| 2018/0097779 | A1 | 4/2018 | Karame et al. |
| 2018/0157700 | A1* | 6/2018 | Roberts ............. G06F 17/30371 |

FOREIGN PATENT DOCUMENTS

| | | |
|---|---|---|
| KR | 100653512 | 11/2006 |
| KR | 101747221 | 6/2017 |
| WO | WO 0049797 | 8/2000 |
| WO | WO 2007069176 | 6/2007 |
| WO | WO 2015077378 | 5/2015 |
| WO | WO 2018013898 A1 | 1/2018 |
| WO | WO 2018109010 | 6/2018 |

OTHER PUBLICATIONS

Watanabe, Hiroki, et al. "Blockchain contract: Securing a blockchain applied to smart contracts." *2016 IEEE International Conference on Consumer Electronics (ICCE)*. IEEE, 2016.

"BlockChain Technology", Berkeley Engineering.

Alsolami, Fahad, and Terrance E. Boult. "CloudStash: using secret-sharing scheme to secure data, not keys, in multi-clouds." *Information Technology: New Generations (ITNG), 2014 11th International Conference on*. IEEE, 2014.

Unkown, "Federated Learning: Collaborative Machine Learning without Centralized Training Data" Apr. 6, 2017, 11 pages.

Casey, "BitBeat: Factom Touts Blockchain Tool for Keeping Record Keepers Honest", Wall Street Journal, Nov. 5, 2014.

Crosby, Michael et al., "BlockChain Technology, Beyond Bitcoin", Sutardja Center for Entrepreneurship & Technology, Berkeley Engineering, Oct. 16, 2015, 35 pages.

Unknown, "Midex", https://promo.midex.com/Midex_EN.pdf, 25 pages.

Unknown, Xtrade White Paper, https://xtrade1-9649.kxcdn.com/wp-content/uploads/2017/09/xtrade-whitepaper.pdf Feb. 7, 2018, 37 pages.

Chakravorty, Antorweep, and Chunming Rong, "Ushare: user controlled social media based on blockchain." *Proceedings of the 11th International Conference on Ubiquitous Information Management and Communication*. ACM, 2017.

Chen, Zhixong, and Yixuan Zhu. "Personal Archive Service System using Blockchain Technology: Case Study, Promising and Challenging." AI & Mobile Services (AIMS), 2017 IEEE International Conference on. IEEE, 2017.

Al-Naji, Nader et al., "Basis: A Price-Stable Cryptocurrency with an Algorithmic Central Bank" www.basis.io Jun. 20, 2017, 27 pages.

Haarmann, et al., "DMN Decision Execution on the Ethereum Blockchain," Hasso Plattner Institute, University of Potsdam, 15 pages.

Kim et al., "A Perspective on Blockchain Smart Contracts," Schulich School of Business, York University, Toronto, Canada, 6 pages.

\* cited by examiner

DATA REPRODUCIBILITY USING BLOCKCHAINS

CROSS-REFERENCE TO RELATED APPLICATIONS

This application relates to U.S. application Ser. No. 15/419,033 filed Jan. 30, 2017, to U.S. application Ser. No. 15/419,042 filed Jan. 30, 2017, to U.S. application Ser. No. 15/435,612 filed Feb. 17, 2017, to U.S. application Ser. No. 15/452,760 filed Mar. 8, 2017, to U.S. application Ser. No. 15/456,067 filed Mar. 10, 2017, to U.S. application Ser. No. 15/459,061 filed Mar. 15, 2017, to U.S. application Ser. No. 15/465,702 filed Mar. 22, 2017, and to U.S. application Ser. No. 15/475,199 filed Mar. 31, 2017, with all applications incorporated herein by reference in their entireties.

BACKGROUND

Artificial intelligence is only growing. More and more software services are using artificial intelligence to suggest products and services, perhaps based on our past behavior, current location, or other activity. In time, though, developers of these software services must document their efforts.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein.

DETAILED DESCRIPTION

Figure 1:
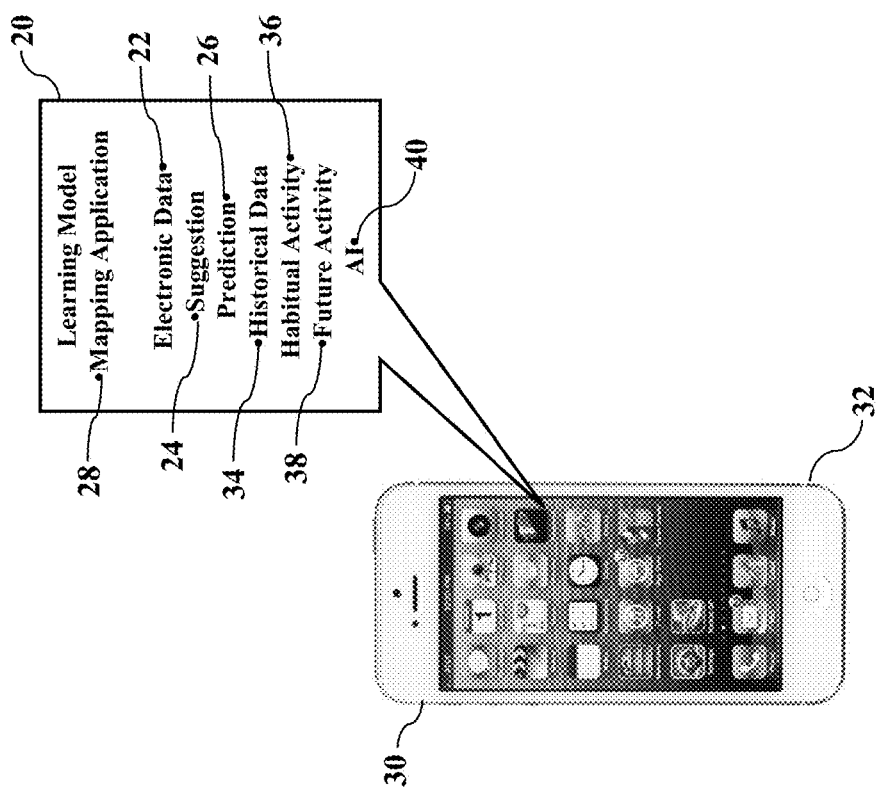
FIGS. 1-9 are simplified illustrations of predictive modeling, according to exemplary embodiments.

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

FIGS. 1-9 are simplified illustrations of predictive modeling, according to exemplary embodiments. While exemplary embodiments may be applied to any social, financial, or technical purpose, most readers are thought familiar with a learning model 20. The learning model 20 is typically a software algorithm that uses electronic data 22 to make some suggestion 24 or prediction 26. For example, the reader is likely familiar with a mapping software application 28 executed by a mobile device 30 (such as a smartphone 32). The mapping software application 28 (such as GOOGLE® MAPS® or APPLE® MAPS®) generally suggests a route to a destination. That is, the mapping software application 28 obtains the electronic data 22 (such as a current location) and determines a road or route to a destination. The mapping software application 28 may even use historical data 34 (such as repeated travels, destinations, and other behavior) to learn habitual activity 36 and to predict future activity 38. The mapping software application 28, in plain words, applies artificial intelligence ("AI") 40 to the electronic data 22 to learn a user's travel patterns, to suggest travel routes, and to predict the user's future location and movements.

Figure 2:
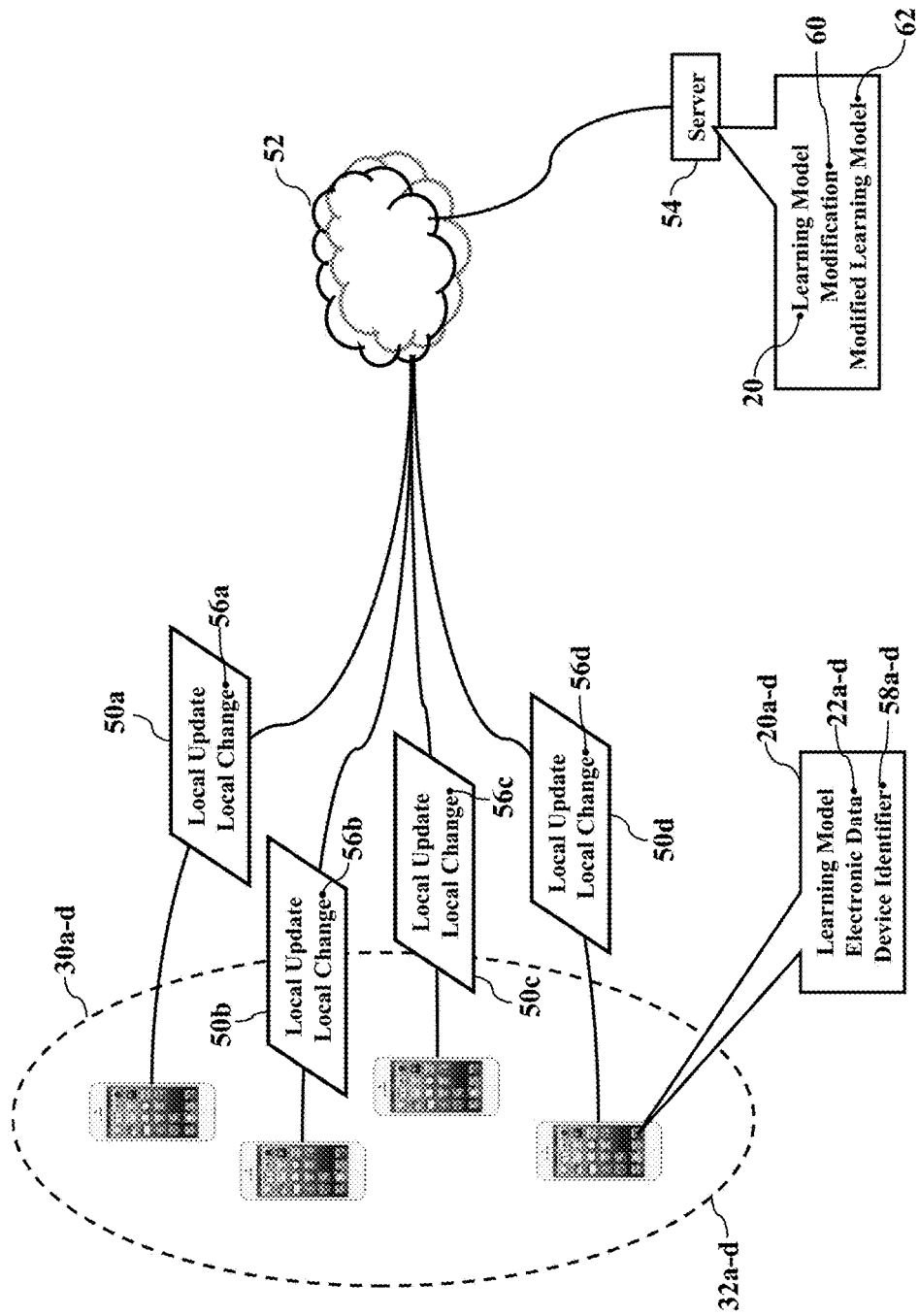

FIG. 2 illustrates federated learning. Here the learning model 20 may be improved based on usage reported by many different mobile devices 30. While the number of mobile devices may be hundreds, thousands, or even millions, FIG. 2 simply illustrates four (4) mobile devices 30a-d. That is, all the mobile devices 30a-d (again illustrated as smartphones 32a-d) execute the learning model 20. Each smartphone 32a-d randomly, periodically, or on command sends a local update 50a-d via a communications network 52 to a server 54. The local update 50a-d may merely summarize a local change 56a-d to the learning model 20. The local change 56a-d may be based on the raw electronic data 22a-d gathered by, or processed by, the learning model 20. The local update 50a-d may thus describe a local, focused, micro-report generated by the learning model 20. The local update 50a-d may be a file that includes or specifies an alphanumeric device identifier 58a-d that uniquely identifies the corresponding mobile device 30a-d, but otherwise the local update 50a-d may be anonymous for privacy concerns. Regardless, the server 54 may use the local updates 50a-d to improve the learning model 20. Indeed, the server 54 may aggregate the local updates 50a-d to generate a learning modification 60 to the learning model 20. The learning modification 60 is generally a software change that improves a performance criterion (e.g., cost, performance, timing). The server 54 may then download a modified learning model 62 that implements the learning modification 60 based on actual usage reported by the mobile devices 30a-d. This recursive or feedback process allows the mobile devices 30a-d to collaboratively learn and improve the shared learning model 20.

Figure 3:
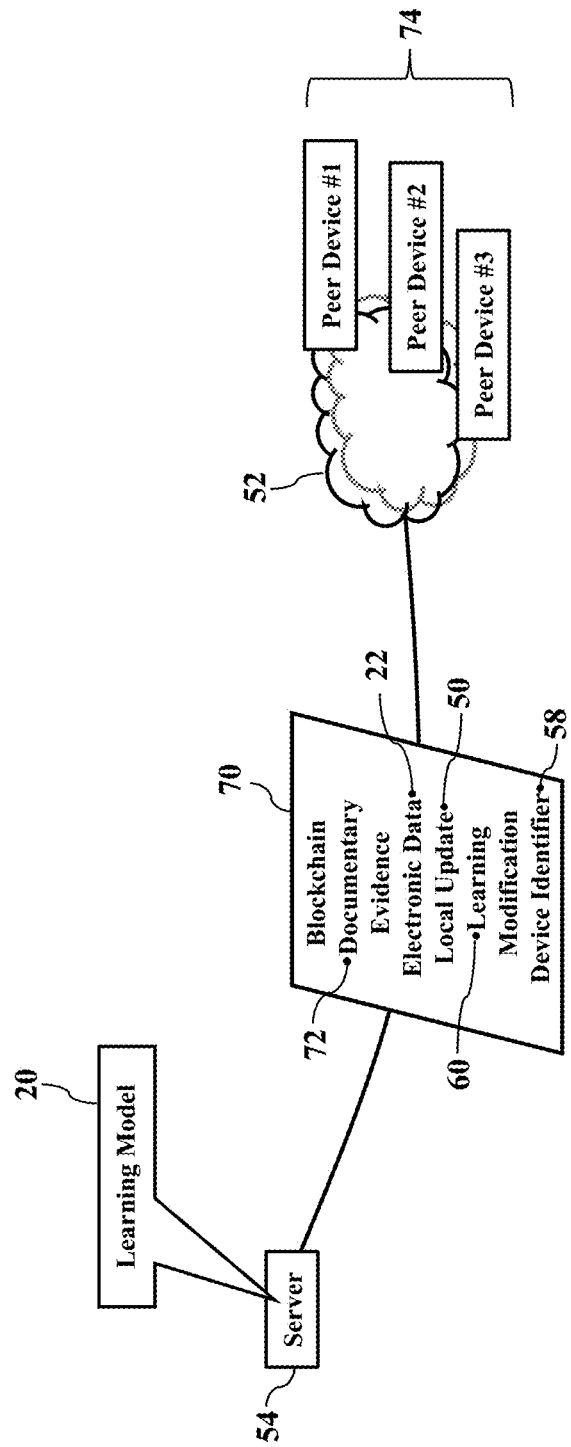

FIG. 3 illustrates a blockchain 70. Exemplary embodiments may use blockchain technology as documentary evidence 72 of the learning model 20. That is, exemplary embodiments may record the electronic data 22, the local update 50, and/or the learning modification 60 as a record in the blockchain 70. As the reader may understand, the blockchain 70 is generally a digital ledger in which data and other transactions are chronologically and/or publically recorded. The blockchain 70 is most commonly used in decentralized cryptocurrencies (such as Bitcoin). Exemplary embodiments, however, may adapt the blockchain 70 to artificial learning environments. The blockchain 70 may be used to prove custody of the electronic data 22 used by, and/or changes made to, the learning model 20. Regardless, the server 54 may integrate the electronic data 22, the local update 50, and/or the learning modification 60 into the blockchain 70 for distribution or publication. The device identifier 58 may also be incorporated to distinguish different data records generated by different devices. While the server 54 may send the blockchain 70 to any destination address, FIG. 3 illustrates one or more trusted peer devices 74. The server 54 may distribute the blockchain 70 to an Internet protocol address associated with any of the trusted peer devices 74.

Figure 4:
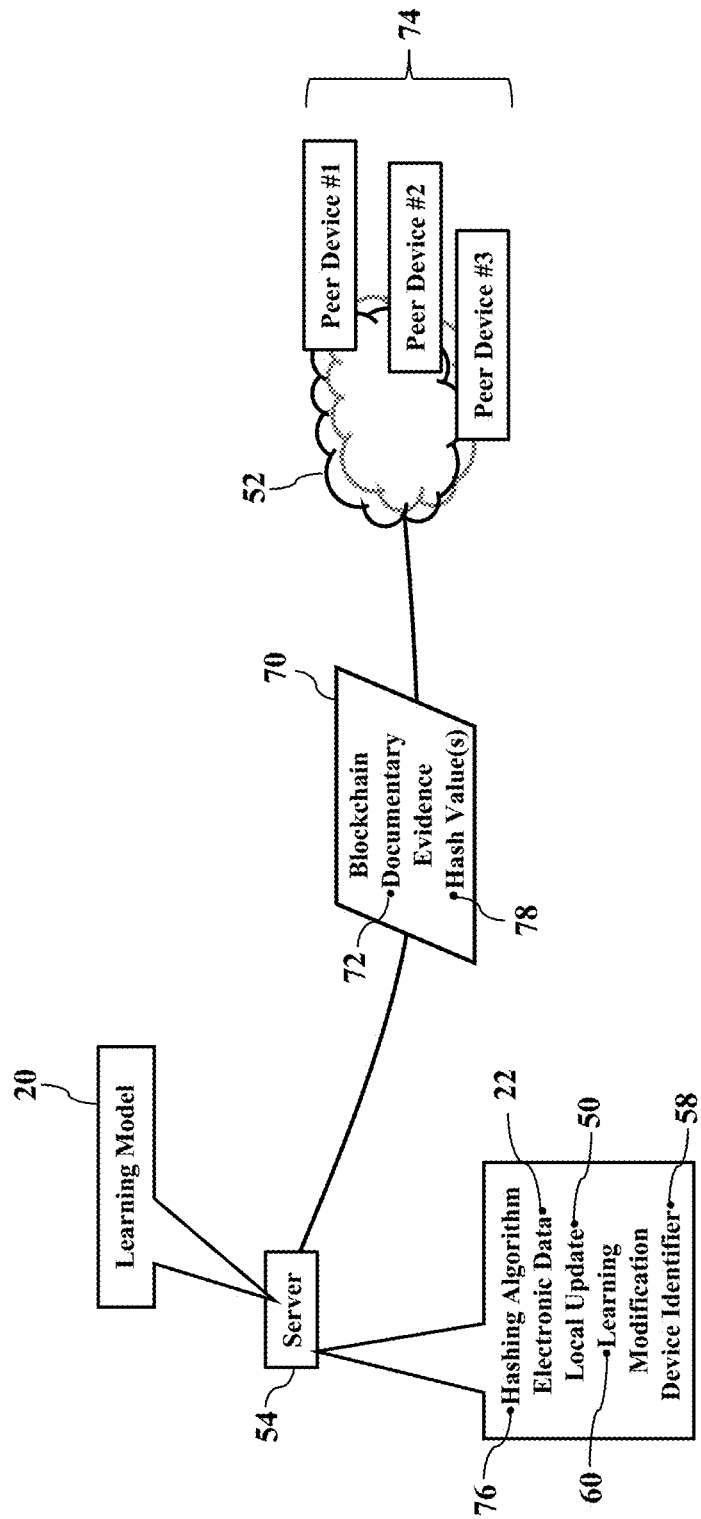

FIG. 4 illustrates hashing. Here exemplary embodiments may apply a hashing algorithm 76 to generate one or more hash values 78. Exemplary embodiments may thus integrate the hash value(s) 78 into the blockchain 70. For example, the server 54 may call or invoke an electronic representation of the hashing algorithm 76 to act on the data or information representing the electronic data 22, the local update 50, and/or the learning modification 60. The hashing algorithm 76 generates the cryptographic hash values 78 (sometimes termed digital keys or signatures), which may then be integrated into the blockchain 70. The blockchain 70 may thus publish or distribute the cryptographic hash values 78 to the trusted peer devices 74.

Exemplary embodiments thus present elegant reproducibility tools. Exemplary embodiments may use blockchain technology to reproduce any changes made to the learning model 20. The blockchain 70 may contain data records that document the raw electronic data 22 used by the learning model 20. The blockchain 70 may additionally or alternatively contain data records that document the local update(s) 50 used to improve the learning model 20. The blockchain 70 may additionally or alternatively contain data records that document the learning modification 60 implemented in response to the raw electronic data 22 and/or the local update(s) 50. The blockchain 70 may additionally or alternatively contain the cryptographic hash values 78 representing the electronic data 22, the local update 50, and/or the learning modification 60. Because the blockchain 70 contains this documentary evidence 72, any recipient of the blockchain 70 may inspect the blockchain 70 (perhaps according to the device identifier 58) and chronologically reproduce any data and/or changes implemented during federated learning.

Figure 5:
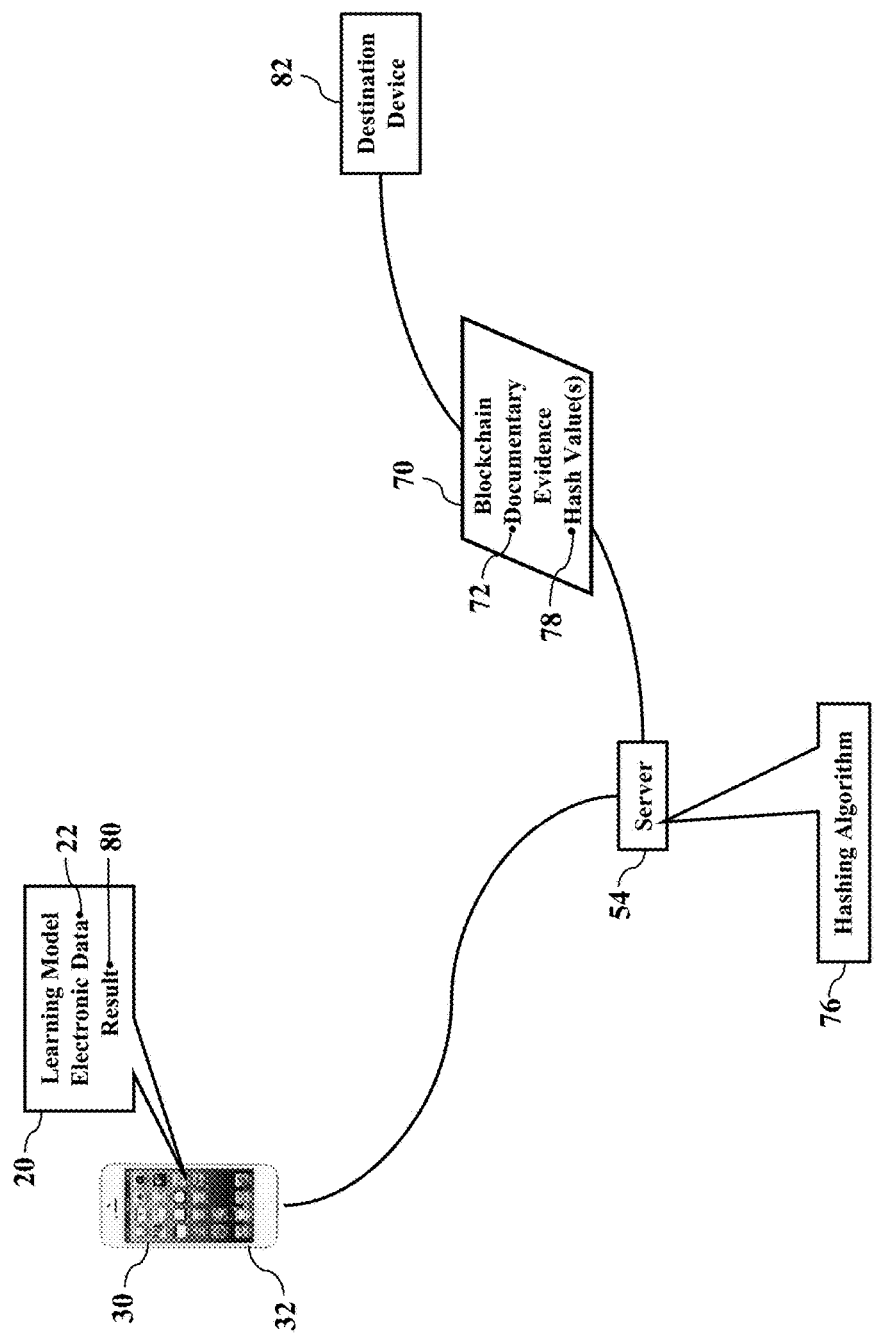

FIG. 5 illustrates a general scheme of reproducibility. The learning model 20 may use the raw electronic data 22 (perhaps stored by the mobile device 30) to generate a result 80 (such as the suggestion 24, the prediction 26, and/or the local update 50 illustrated in FIG. 1). The learning model 20 may then report at least a portion of the result 80 to the server 54. The server 54 may use the result 80 to generate the learning modification 60 that improves or otherwise changes the learning model 20. The server 54 may then publish the result 80 and/or the learning modification 60 via the blockchain 70 to any destination device 82. The blockchain 70 thus serves as the documentary evidence 72 for any changes or modifications to the learning model 20. Exemplary embodiments may additionally hash the result 80 and/or the learning modification 60 (using the hashing algorithm 76) and distribute the cryptographic hash value(s) 78 via the blockchain 70 as a further security measure. Any recipient of the blockchain 70 may thus reproduce the result 80 and/or the learning modification 60.

Exemplary embodiments may be applied to any software application and to any objective. This disclosure mainly discusses the learning model 20 as the mapping software application 28, as many readers have used mapping services (such as GOOGLE® MAPS® and APPLE® MAPS®). However, exemplary embodiments are applicable to any learning and/or predictive service, such as dating apps, autonomous driving software, energy consumption software (such as learning HVAC thermostats and other home automation services), predictive food/dinner software, social networking software, and any other software using the artificial intelligence 40.

Exemplary embodiments help validate software developers. As the artificial intelligence 40 (or "machine learning") is applied to more and more real world situations and services, the inventors foresee that software developers will have to thoroughly document their efforts. For example, as self-driving cars add users and accrue mileage, accidents will occur and liability may be at issue. Developers of autonomous driving software (e.g., the learning model 20) may have to reproduce the result 80 and perhaps prove that the learning model 20 could not have caused a vehicular accident. Similarly, developers of mapping services may have to prove that their software is not liable for accidents, muggings, and other crimes along a suggested route. Developers of dating apps and other social services may have to prove that their software is not liable for personal mismatches, poor recommendations, or crimes committed during social suggestions. Should a learning thermostat overheat a room (perhaps causing death of an occupant or pet), the developer may have to prove that the learning model 20 could not have caused injury. Because exemplary embodiments provide the documentary evidence 72 of the developer's efforts, the developer need only retrieve the historical records integrated into the blockchain 70.

Exemplary embodiments also help prevent fraud. As the artificial intelligence 40 grows in usage, unscrupulous activity may also grow. Rogue entities, in other words, may try to hack the electronic data 22, and/or the learning model 20, to cause harm or injury. Exemplary embodiments thus implement protections against fraudulent efforts. The blockchain 70 allows a software developer to document the result 80 generated by the learning model 20, perhaps in near real time. The blockchain 70 documents a current state or version of the learning model 20, any changes to the learning model 20, and/or any of the electronic data 22 used or acted on by the learning model 20. The software developer may thus retrieve any historical records integrated into the blockchain 70 to prove the learning model 20 could not have resulted in damage or injury. In other words, the raw electronic data 22, the local update 50, and/or the learning modification 60 could not have caused harm to person or to property. The blockchain 70 may thus provide the documentary evidence 72 of custody/possession of an original, unaltered version of the electronic data 22. The blockchain 70 may also provide the documentary evidence 72 that the smartphone 32 generated the original, unaltered version of the electronic data 22 (and not some other, different, or alleged device). Moreover, the blockchain 70 may also provide the documentary evidence 72 that none of the electronic data 22 is missing.

Figure 6:
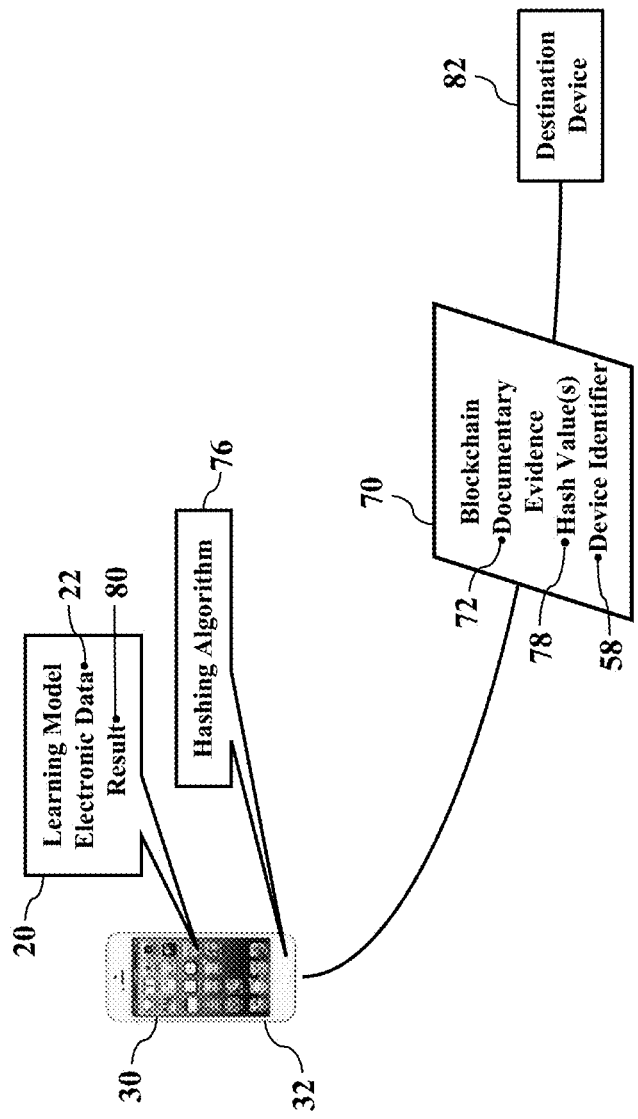

FIG. 6 illustrates device reproducibility. Here the mobile device 30 may document the learning model 20 using the blockchain 70. That is, the mobile device 30 (again illustrated as the smartphone 32) may integrate the raw electronic data 22 and/or the result 80 (such as the suggestion 24, the prediction 26, and/or the local update 50 illustrated in FIG. 1)) as electronic data records in the blockchain 70. The mobile device 30 may also hash the raw electronic data 22 and/or the result 80 (using the hashing algorithm 76) and distribute the cryptographic hash value(s) 78 via the blockchain 70. The mobile device 30 may then send the blockchain 70 to any recipient, such as the destination device 82. The blockchain 70 may thus be individualized or dedicated to documenting the learning model 20 locally executed by the mobile device 30. The blockchain 70 may thus contain or specify the device identifier 58 that uniquely identifies the mobile device 30. The device identifier 58 (such as any unique alphanumeric combination) may uniquely identify or associate the blockchain 70 with the mobile device 30. The blockchain 70 may thus historically record the learning model 20, perhaps according to date, time, geographic location (perhaps using global positioning system information), and the device identifier 58.

Figure 7:
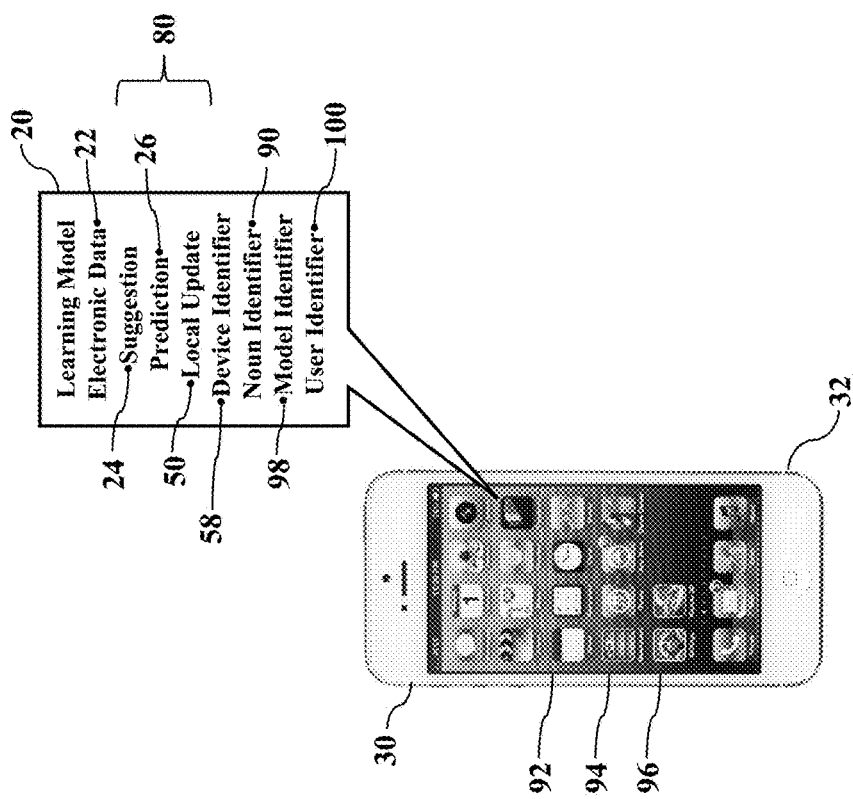

FIG. 7 illustrates noun chaining. Here exemplary embodiments may generate data records for many different learning models 20. Again, as this disclosure above explained, the mobile device 30 may store and execute many different predictive software applications (such as the aforementioned "apps" for mapping services, dating services, and home automation). Each different learning model 20 may thus gather different electronic data 22 to generate different results 80. Exemplary embodiments may thus organize or specify data records according to a noun identifier 90. The noun identifier 90 uniquely identifies a source that generates or uses the electronic data 22 to generate the result 80. The noun identifier 90 may thus be an alphanumeric hardware, software, and/or user descriptor. For example, if the electronic data 22 is sourced from, or used by, an internal hardware component, the device identifier 58 may uniquely identify the internal hardware component (such as the smartphone 32, a processor 92, a memory device 94, and/or network interface 96). If the electronic data 22 is sourced from, or used by, a software application, an alphanumeric model identifier 98 may uniquely identify the learning model 20. The noun identifier 90 may also include an alphanumeric user identifier 100 that uniquely identifies a current user of the smartphone 32. When any data or information is integrated into the blockchain 70 (illustrated in FIGS. 3-6), exemplary embodiments may also add, append, incorporate the corresponding noun identifier 90, device identifier 58, model identifier 98, and/or user identifier 100 to distinguish between data records from different sources. Exemplary embodiments may also hash the noun identifier 90, device identifier 58, model identifier 98, and/or user identifier 100 as further cryptographic differentiation.

Noun chaining may thus be useful for the Internet of Things. As the reader may be aware, more and more devices are equipped with network access. Smartphones, tablet computers, laptop computers, and other processor-controlled devices commonly have Internet access. Moreover, refrigerators and other appliances are also offered with Internet access. Indeed, in the coming years, millions of devices per square mile are predicted to have network access. Exemplary embodiments may thus generate an individual blockchain 70 per device, per software application (per learning model 20), and/or per user. Different blockchains 70, in other words, may be dedicated to data records associated with each noun identifier 90, each device identifier 58, each model identifier 98, and/or each user identifier 100.

Figure 8:
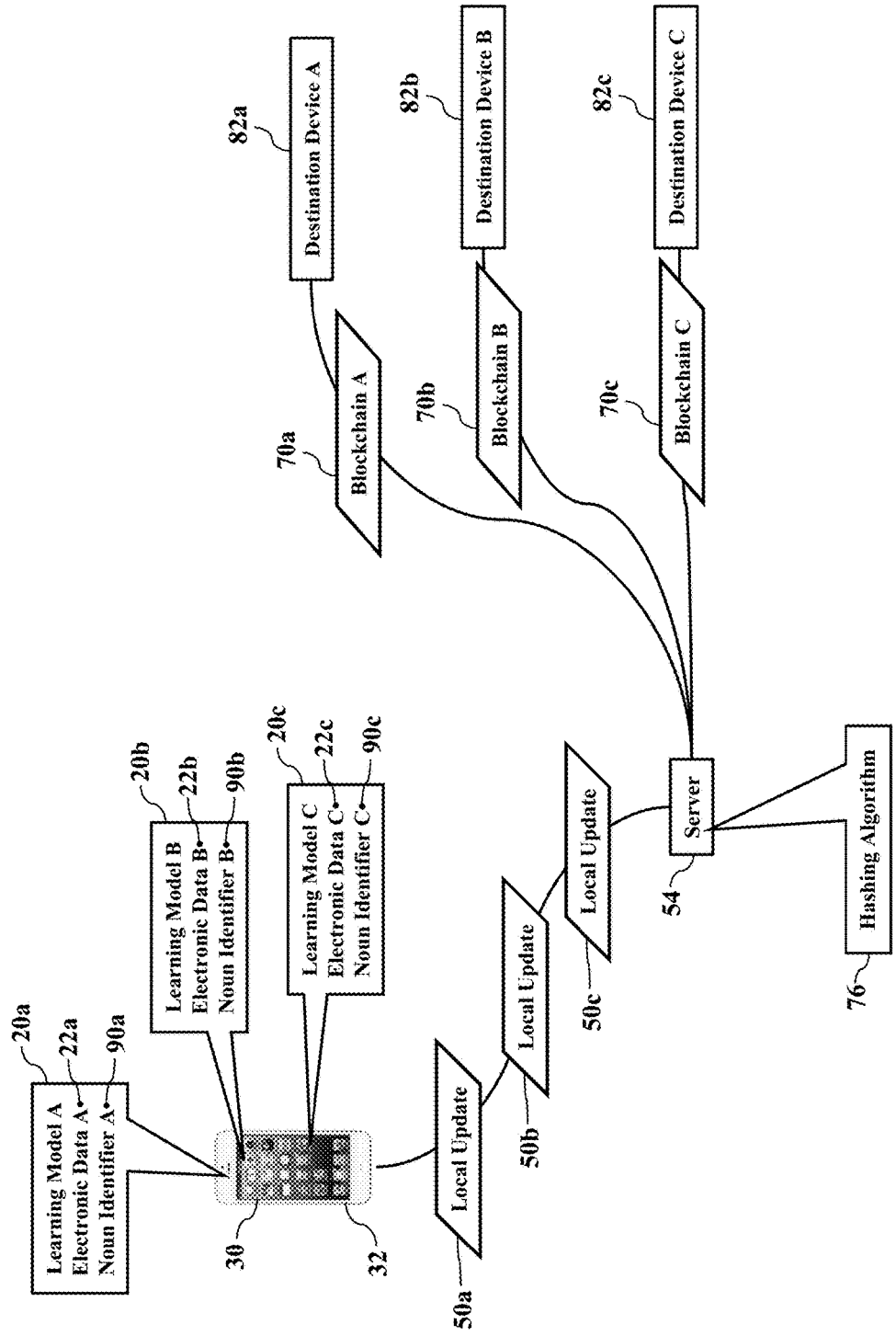

FIG. 8 illustrates combinational noun chaining. Here different blockchains 70 may be dedicated to data records associated with intersecting or combinational noun identifiers 90. Again, as this disclosure above explained, the mobile device 30 may store and execute many different learning models (simply illustrated as reference numeral 20a-c) (such as the aforementioned "apps" for mapping services, dating services, and home automation). Exemplary embodiments may thus generate corresponding, multiple blockchains 70a-c, which each different blockchain 70a-c dedicated to a different one of the learning models 20a-c. FIG. 8, for example, illustrates a first blockchain 70a integrating the local update 50a generated by the smartphone 32 executing a first learning model 20a. The first blockchain 70a, in other words, may integrate data records associated with the noun identifier 90a. A second blockchain 70b may integrate data records associated with the noun identifier 90b. The second blockchain 70b, in other words, is dedicated to documenting any usage, activity, or data associated with the smartphone 32 executing a second learning model 20b. Still a third blockchain 70c may be dedicated to documenting the usage, activity, or data 22 associated with a third learning model 20c. Exemplary embodiments may thus generate the multiple blockchains 70a-c, which each different blockchain 70 dedicated to a different one of the learning models 20a-c.

Figure 9:
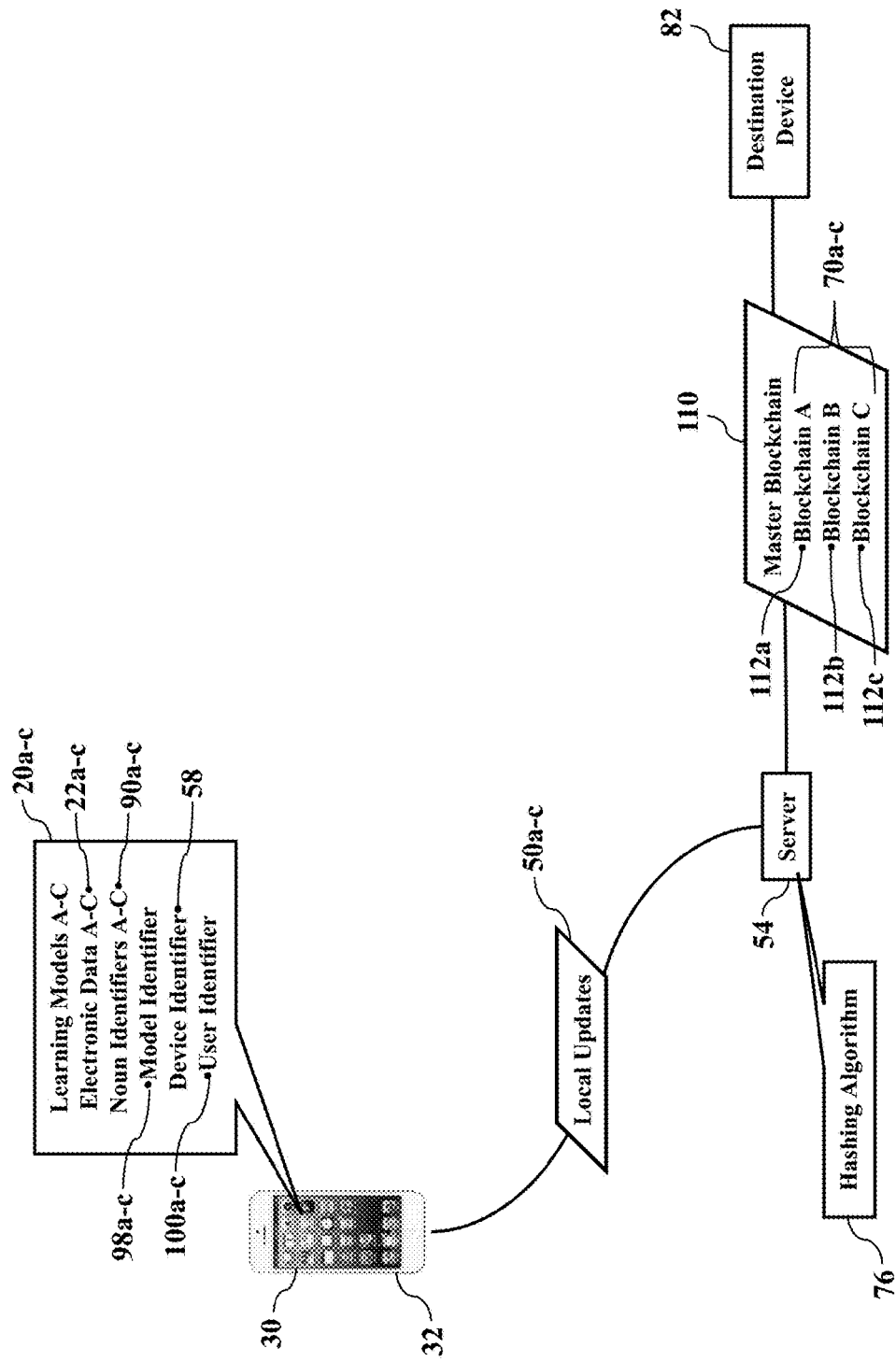

FIG. 9 illustrates master chaining. Because exemplary embodiments may generate multiple different blockchains 70a-c (perhaps according to each noun identifier 90a-c), FIG. 9 illustrates a master blockchain 110. The master blockchain 110 may incorporate one or more of the individual blockchains 70a-c. The master blockchain 110 may thus be associated with, or integrate, one or more sub-blockchains 112. As a simple example, suppose that the master blockchain 110 is dedicated to the mobile device 30 (again illustrated as the smartphone 32). A first sub-blockchain 112a may be dedicated to the first learning model 20a stored and executed by the smartphone 32. The first sub-blockchain 112a may integrate data records describing the raw electronic data 22a used by, and/or the local change 50a generated by, the first learning model 20a. Another, second sub-blockchain 112b may be dedicated to the second learning model 20b stored and executed by the smartphone 32. Still a third sub-blockchain 112c may be dedicated to the third learning model 20c stored and executed by the smartphone 32. Similarly, the second and the third sub-blockchains 112b and 102c integrate data records describing the raw electronic data 22b and 22c used by, and/or the local change 50b and 50c generated by, the second and third learning models 20b and 20c. The master blockchain 110 may thus document application-specific information according to the noun identifier 90a-c.

Blockchain dedication, in general, may be based on the noun identifier 90. The noun identifier 90 may represent one or more of the device identifier 58, the model identifier 98, and/or the user identifier 100. The noun identifier 90 may thus be any alphanumeric combination that uniquely identifies the source that generates or uses the electronic data 22 to generate the local update 50. The noun identifier 90 may thus pinpoint the mobile device 30, the learning model 20, and even the current user generating training data. Indeed, as the reader understands, people often share computers, tablets, smartphones, and other devices. As the mobile device 30 (again illustrated as the smartphone 32) executes the different learning models 20a-c, exemplary embodiments may track the sub-blockchains 112a-c according to the corresponding noun identifier 90 (the device identifier 58, the model identifier 98, and/or the user identifier 100). Suppose, for example, a first user (e.g., user identifier 100a) selects a dating application (learning model 20a having model identifier 98a), resulting in the first sub-blockchain 112a. A second user (e.g., user identifier 100b) then picks up the smartphone 32 (the device identifier 58) to use a mapping application (learning model 20b having model identifier 98b), resulting in the second sub-blockchain 112b. A third user (e.g., user identifier 100c) then picks up the smartphone 32 to suggest a jogging route (learning model 20c having model identifier 98c), resulting in the third sub-blockchain 112c. Exemplary embodiments may thus integrate data records that individually specify the source "noun" (e.g., the device, the learning model 20, and/or the user). The master blockchain 110 may thus document device-specific, user-specific, and application-specific information.

The master blockchain 110 and the sub-blockchains 112 may have any structure. FIG. 9, for simplicity, illustrates the sub-blockchains 112 within, or internal to, the master blockchain 110. However, exemplary embodiments need not have a physical, internal/external arrangement. That is, the master blockchain 110 need not physically contain the one or more sub-blockchains 112. In actual practice the master blockchain 110 may have blocks or regions of data, with each block or region specifying at least a portion of the sub-blockchains 112a. Each different block, in other words, may specify, group, or arrange data records having the same or similar noun identifier 90, device identifier 58, model identifier 98, and/or user identifier 100. Indeed, certain blocks of data or other portions may be reserved for a corresponding one of the sub-blockchains 112. Data records referenced by the master blockchain 110 and/or the sub-blockchains 112 may thus be containers or ranges dedicated to a particular device, learning model 20, and/or user. The master blockchain 110 and/or the sub-blockchains 112 may additionally or alternatively group or arrange packets of data according to the noun identifier 90, device identifier 58, model identifier 98, and/or user identifier 100. A packetizing protocol (such as the well-known Internet protocol) may be used to arrange commonly-associated packets of data.

Exemplary embodiments are thus helpful in federated learning. Federated learning aggregates individualized usage of a population of devices to generate an improvement to the learning model 20. Federated learning allows the population of devices to collaboratively learn and to improve the predictive learning model 20, based on their individual local updates 50. The blockchain 70 may thus store original versions of any data described by the local update 50 and/or used to train or improve the learning model 20. The original versions of the data may be raw and unencrypted, encrypted, and/or hashed (using the hashing algorithm 76 above discussed). Indeed, the cryptographic hash values 78 may be used to validate the original versions of the data. The mobile device 30 may even store and execute trusted platform modules to sign the electronic data 22, thus proving that the mobile device 30, and only the mobile device 30, generated the electronic data 22. As each piece of data—or its hash thereof—may be stored in the blockchain 70, any missing data is immediately obvious (that is, if the hash value 78 is documented in the blockchain 70, then its corresponding unhashed data may or should also be documented in the blockchain 70). Exemplary embodiments thus allow reproducibility of data in federated learning using the blockchain 70.

Figure 10:
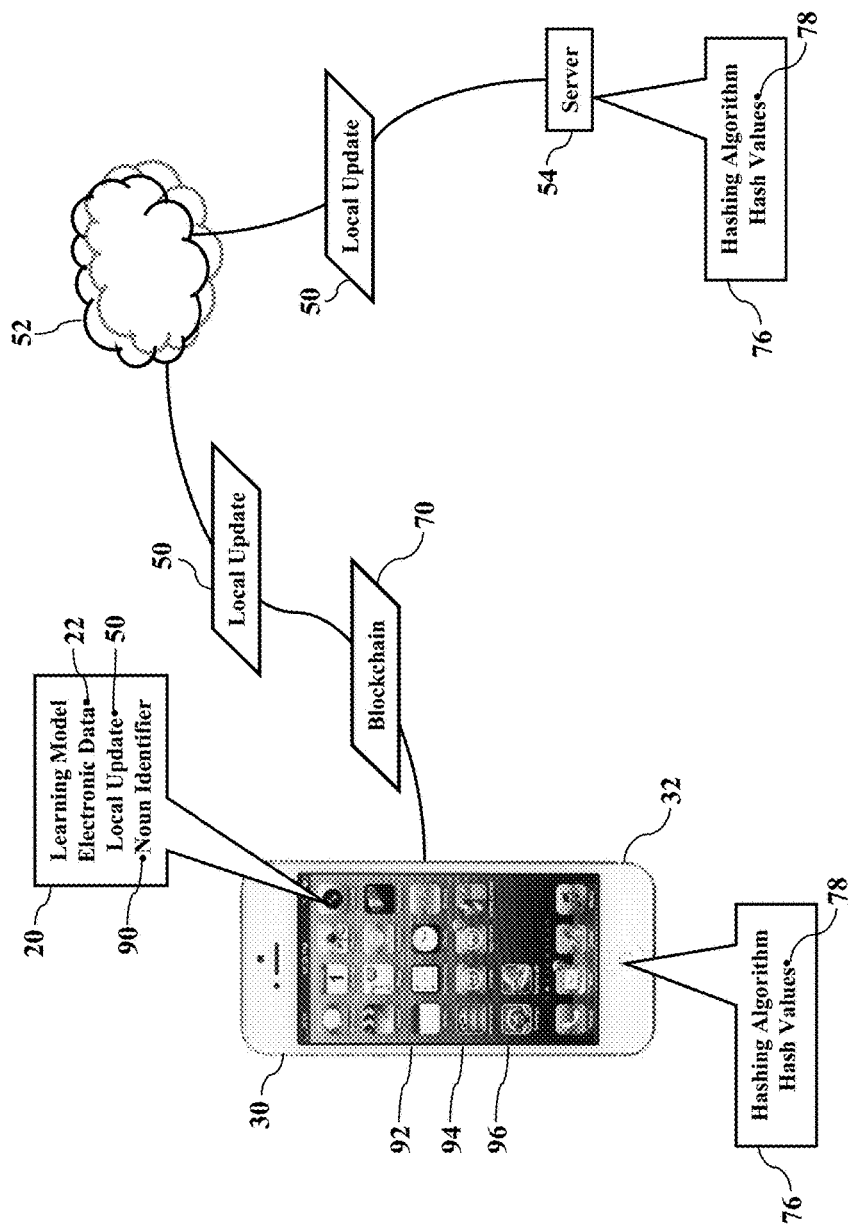
FIGS. 10-12 are more detailed illustrations of an operating environment, according to exemplary embodiments.
Figure 11:
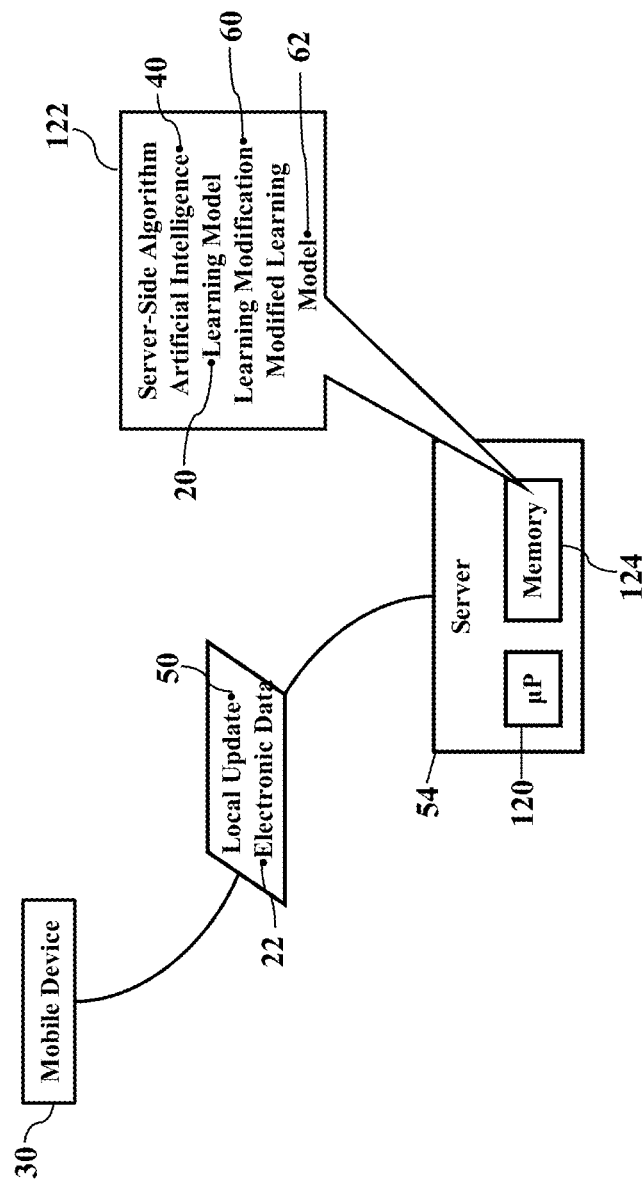
Figure 12:
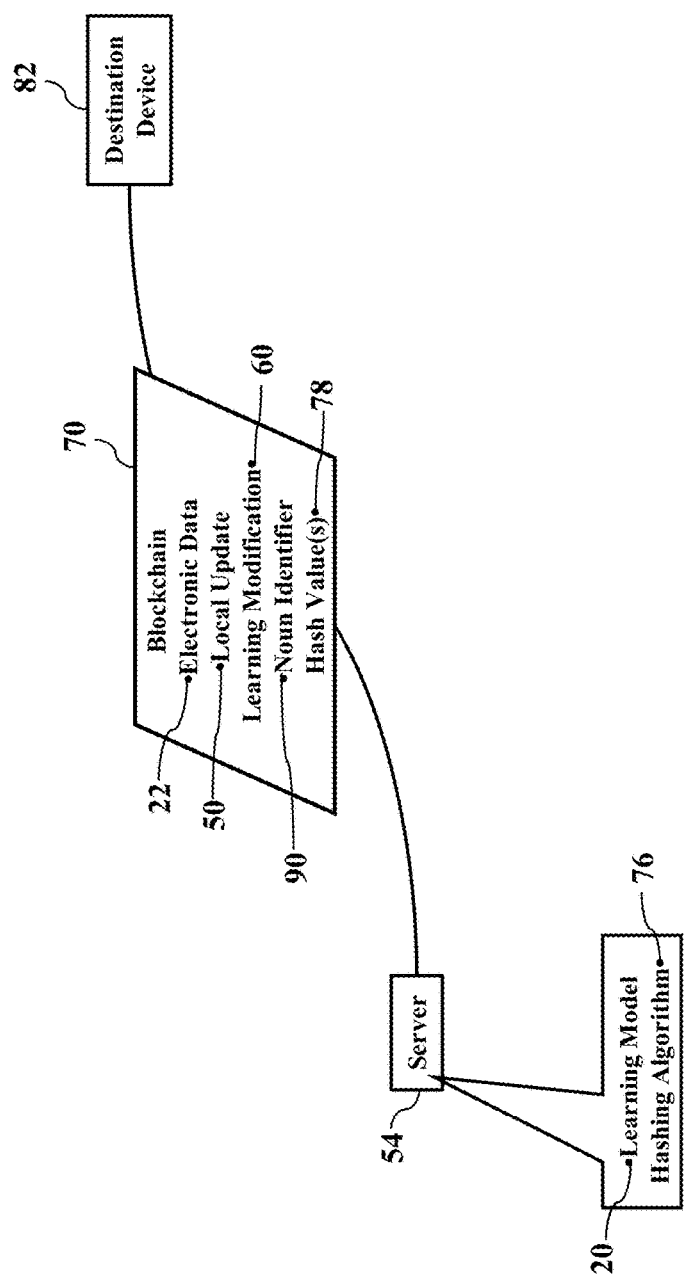

FIGS. 10-12 are more detailed illustrations of an operating environment, according to exemplary embodiments. FIG. 10 illustrates the mobile device 30 communicating with the server 54 via the communications network 52. Again, most readers are thought familiar with the smartphone 32, but the mobile device 30 may be any mobile or stationary processor-controlled device. The smartphone 32 has the processor 92 (e.g., "µP"), application specific integrated circuit (ASIC), or other component that executes the learning model 20 stored in the local memory device 94. The smartphone 32 also has the network interface 96 to the communications network 52, thus allowing two-way, bidirectional communication with the server 54. The learning model 20 includes instructions, code, and/or programs that cause the smartphone 32 to perform operations, such as generating the local update 50 to the learning model 20 based on the electronic data 22. The local update 50 may additionally include or specify the noun identifier 90 (e.g., the device identifier 58, the model identifier 98, and/or user identifier 100) generating or sourcing the local update 50. The smartphone 32 may send the local update 50 via the communications network 52 to the server 54 for analysis. The smartphone 32, however, may additionally or alternatively integrate the electronic data 22 and/or the local update 50 into the blockchain 70 for distribution/publication to any destination (again, perhaps the server 54). Moreover, exemplary embodiments may call or invoke the hashing algorithm 76 to act on the electronic data 22 and/or the local update 50 to generate the cryptographic hash value(s) 78.

FIG. 11 further illustrates the server 54. The server 54 may have a processor 120 (e.g., "µP"), application specific integrated circuit (ASIC), or other component that executes a server-side algorithm 122 stored in a local memory device 124. The server-side algorithm 122 may include software code or instructions that apply the artificial intelligence 40 to the electronic data 22, and/or the local update 50, reported by the mobile device 30. The server 54 thus generates the learning modification 60 to the learning model 20, based on the usage or activity reported by the mobile device 30. The server-side algorithm 122 thus includes instructions, code, and/or programs that cause the server 54 to perform operations, such as improving or refining the learning model 20 based on information sent from the mobile device 30. Indeed, in a federated, collaborative learning environment, the server 54 may aggregate many local updates 50 from many client devices to determine the learning modification 60 to the learning model 20 (as explained with reference to FIG. 2). The field population of devices executing the learning model 20, in other words, may collaboratively train the learning model 20, based on the local update(s) 50. The server 54 may thus generate the modified learning model 62 to implement a performance enhancement, perhaps based on an average or other statistical analysis of the local update 50.

FIG. 12 further illustrates the documentary evidence 72. Here the server 54 may historically record and track any changes to the learning model 20. That is, exemplary embodiments may use the blockchain 70 to prove custody of any data used by, and/or changes made to, the learning model 20. For example, the server 54 may integrate the electronic data 22, the local update 50, and/or the learning modification 60 into the blockchain 70 for distribution or publication. The blockchain 70 may further integrate or associate the corresponding noun identifier 90 to uniquely identify the source(s) responsible for the changes to the learning model 20. Moreover, exemplary embodiments may apply the hashing algorithm 76 to generate the one or more cryptographic hash values 78 and to integrate the hash values 78 into the blockchain 70.

Exemplary embodiments may use any hashing function. Many readers may be familiar with the SHA-256 hashing algorithm. The SHA-256 hashing algorithm acts on any electronic data or information to generate a 256-bit hash value 78 as a cryptographic key. The key is thus a unique digital signature. There are many hashing algorithms, though, and exemplary embodiments may be adapted to any hashing algorithm.

Exemplary embodiments may be applied regardless of networking environment. Exemplary embodiments may be easily adapted to stationary or mobile devices having cellular, wireless fidelity (WI-FI®), near field, and/or BLUETOOTH® capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations," this could include the processor performing the operations directly and/or facilitating, directing, or cooperating with another device or component to perform the operations.

Exemplary embodiments may packetize. The mobile device 30 and the server 54 may have network interfaces to the communications network 52, thus allowing collection and retrieval of information. The information may be received as packets of data according to a packet protocol (such as the Internet Protocol). The packets of data contain bits or bytes of data describing the contents, or payload, of a message. A header of each packet of data may contain routing information identifying an origination address and/or a destination address.

Figure 13:
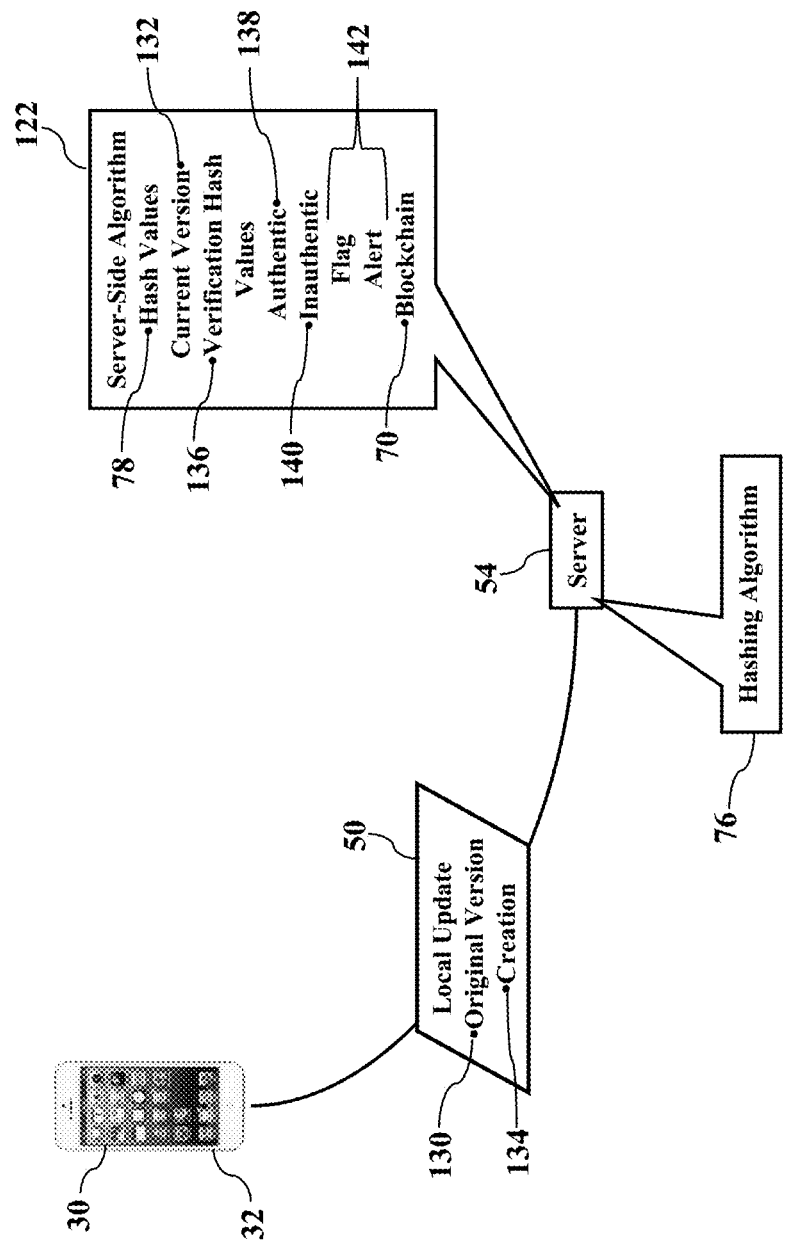
FIGS. 13-14 illustrate data verification, according to exemplary embodiments.
Figure 14:
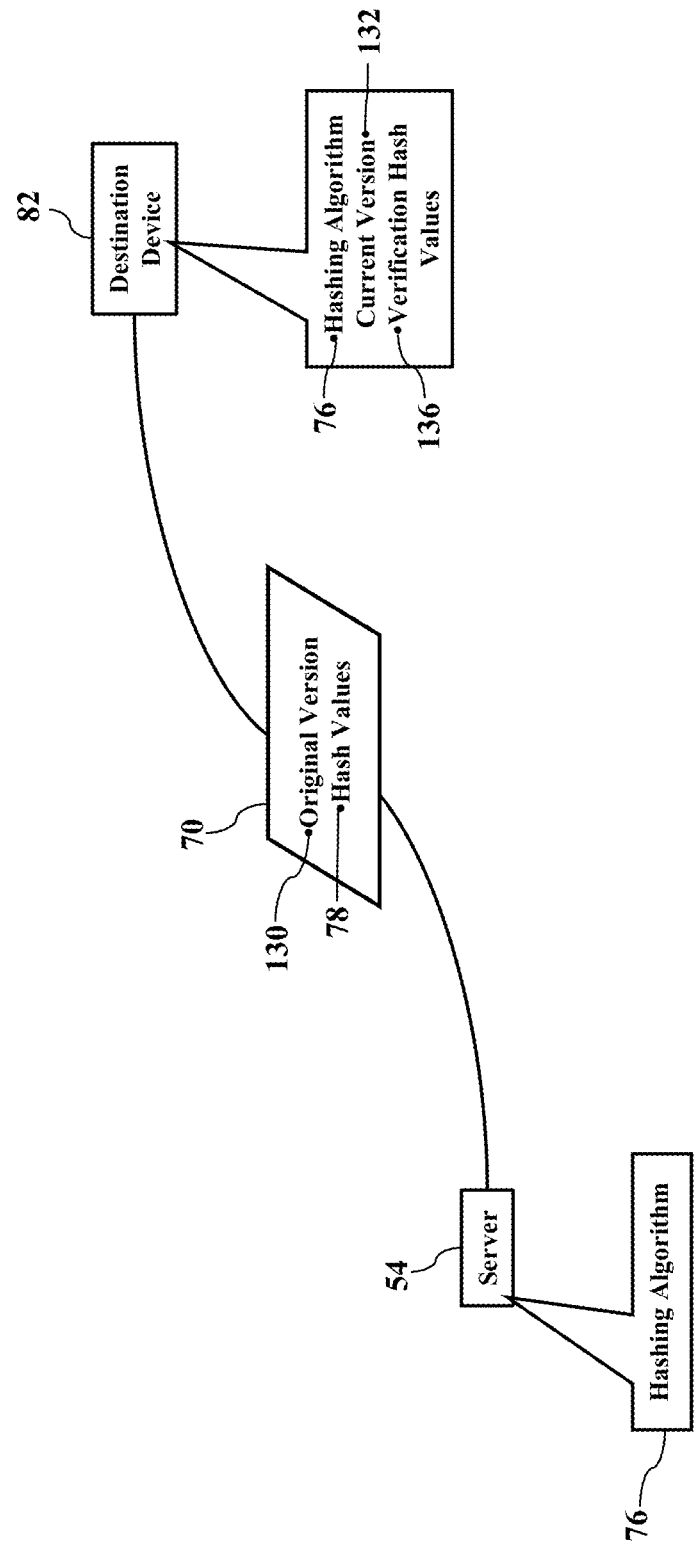

FIGS. 13-14 illustrate data verification, according to exemplary embodiments. Here exemplary embodiments may discern or differentiate an original version 130 from a later or current version 132. While data verification may be performed by any device, for simplicity FIG. 13 illustrates the server 54. For example, when the smartphone 32 reports the local update 50, the local update 50 has the original version 130 generated or saved at approximately a date and time of a creation 134. The server-side algorithm 122 may thus cause the server 54 to obtain or retrieve the current version 132 of the local update 50. As the reader may understand, the current version 132 (perhaps as of a current date and time) may be different, perhaps only slightly, from the original version 130 generated or saved approximately at the creation 134. Any difference between the original version 130 and the current version 132 may indicate an unintentional, or intentional, change to the local update 50.

Exemplary embodiments may verify, or deny, originality. Exemplary embodiments may perform cryptographic comparisons to discern data differences. That is, the server 54 may retrieve the cryptographic hash value(s) 78 generated from hashing the original version 130 of the local update 50. The server 54 may also retrieve and hash the current version 132 of the local update 50 (using the same cryptographic hashing algorithm 76) to generate one or more verification hash values 136. If the verification hash values 136 match the cryptographic hash values 78 generated from the original version 130 of the local update 50, then the local update 50 has not changed since the date and time of creation 134. That is, the current version 132 of the local update 50 is the same as the original version 130, unaltered, and thus authentic 138. However, if the verification hash values 136 (generated from hashing the current version 132 of the local update 50) fail to match the cryptographic hash values 78 generated from the original version 130 of the local update 50, then the current version 132 has changed since the date and time of creation 134. Exemplary embodiments, in other words, reveal an alteration that may indicate the current version 132 is inauthentic 140. Exemplary embodiments may thus generate a flag or other alert 142 to initiate further investigation.

The blockchain 70 may thus provide the documentary evidence 72. If the blockchain 70 integrates data or information representing the original version 130, then the blockchain 70 provides historical records for future verification.

Any recipient of the blockchain 70 may inspect its data records and obtain or retrieve the data representing the original version 130 and/or its corresponding cryptographic hash value(s) 78. If the current version 132 (and/or its corresponding verification hash value 136 fails to substantially or exactly match, then a difference has been detected and the current version 132 is inauthentic 140.

FIG. 14 expands originality. Here the blockchain 70 may historically record the original version 130 of any data (such as the suggestion 24, prediction 26, historical data 34, habitual activity 36, predicted future activity 38, local change 56, and/or learning modification 60 explained herein). The blockchain 70 may also historically record the original version 130 of the noun identifier 90 (e.g., the device identifier 58, the model identifier 98, and/or user identifier 100, as also explained herein). The blockchain 70 may also historically record the hash values 78 representing any of these original versions 130. Any recipient of the blockchain 70 (such as the destination device 82) may thus inspect the data records incorporated into the blockchain 70 and obtain or retrieve the data representing the original versions 130 and/or their corresponding cryptographic hash values 78. If any current version 132 (and/or its corresponding verification hash values 136) fails to substantially or exactly match, then verification may fail.

Exemplary embodiments thus present a simple and effective verification mechanism. Cryptographic hashing may be used to make quick verification decisions. If any entity matches cryptographic digital signatures representing different versions, then perhaps verification is complete and no further investigation is required. But if the current version 132 has changed, the digital signatures will differ, perhaps even substantially. Indeed, even a change to a single bit or character can produce a noticeable difference in hash values. So, if the digital signatures are different, the current version 132 may fail an authentication (e.g., the authentic 138 or inauthentic 140 determination). An auditor or software developer, in other words, may thus simply and quickly discern whether additional investigative scrutiny is needed. The software developer may thus use the blockchain 70 to archive development efforts for historical use and analysis.

Figure 15:
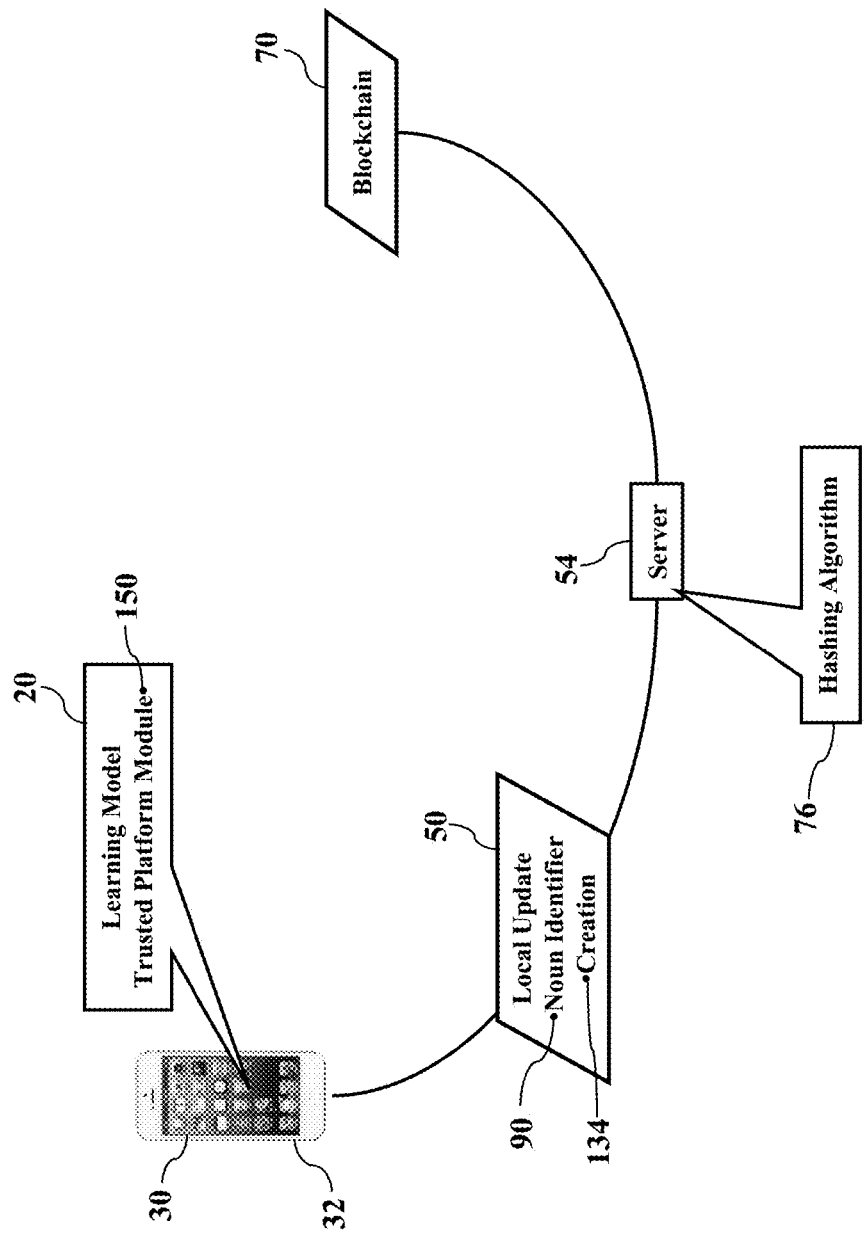
FIG. 15 illustrates trusted platforming, according to exemplary embodiments.

FIG. 15 illustrates trusted platforming, according to exemplary embodiments. Here exemplary embodiments may cryptographically hash the noun identifier 90 as verification of originality. The noun identifier 90, as previously explained, uniquely sources the mobile device 30 (e.g., the device identifier 58), the learning model (e.g., the model identifier 98), and/or the current user (e.g., the user identifier 100) (as explained with reference to FIG. 7). Exemplary embodiments may thus cryptographically hash the noun identifier 90 (using the hashing algorithm 76) to cryptographically bind any change to the learning model 20. For example, exemplary embodiments may use a trusted platform module 150 to securely generate the hash values 78 and to limit or specify permitted usage. The local update 50, for example, may thus be digitally and cryptographically signed and added to the blockchain 70, thus later proving that the mobile device 30, and only the mobile device 30, generated the local update 50. Trusted platforming is generally known, so a detailed explanation is not necessary.

Figure 16:
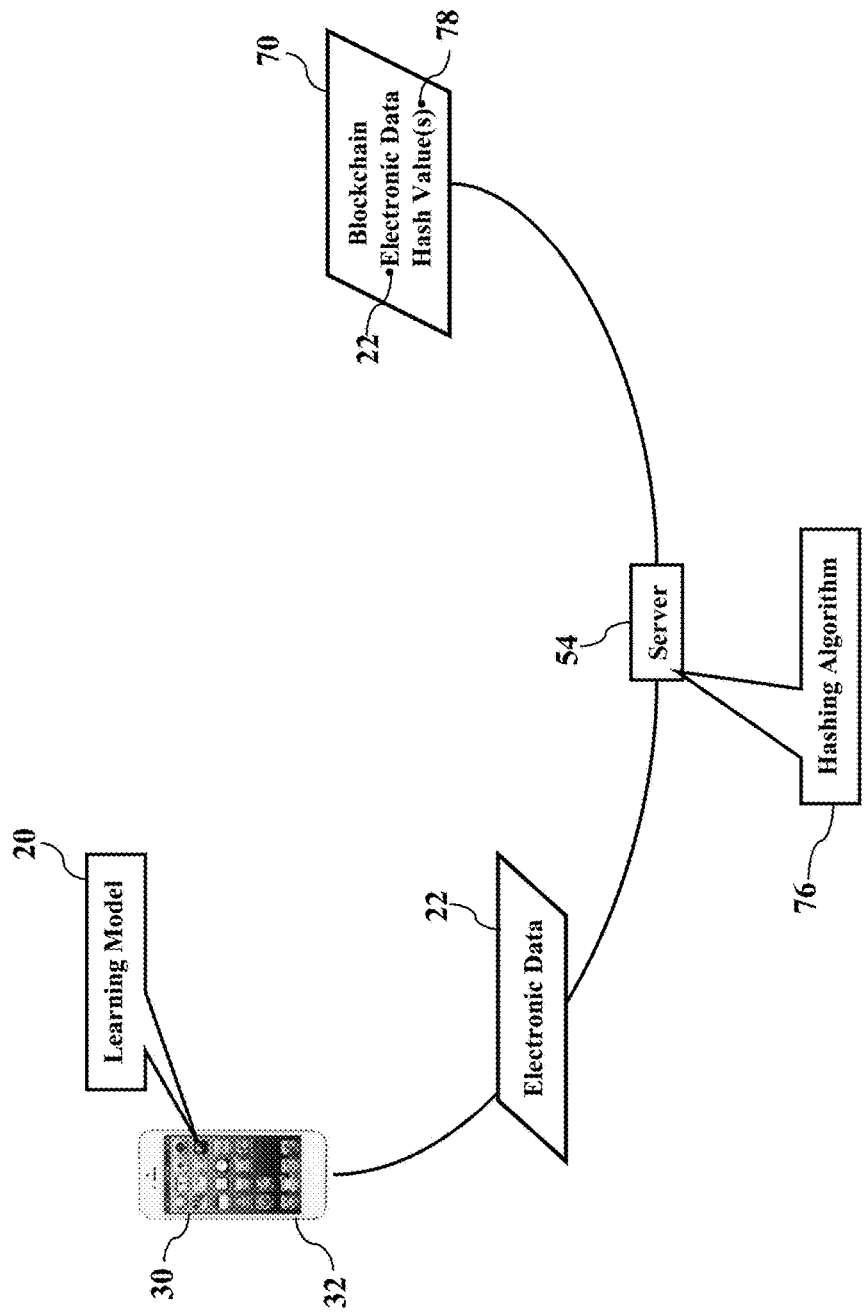
FIG. 16 further illustrates data verification, according to exemplary embodiments.

FIG. 16 further illustrates data verification, according to exemplary embodiments. Here the blockchain 70 may be used to identify missing data records. Suppose the blockchain 70 initially integrates the electronic data 22 and its corresponding hash value 78. Months or even years later, the blockchain 70 may be inspected for the same data records. That is, at any later time after the creation 134, the blockchain 70 may be historically inspected for the electronic data 22 and its corresponding hash value 78. If only the hash value 78 is present at the later time, then exemplary embodiments may infer that the blockchain 70 has been modified or altered. That is, if the data records representing the electronic data 22 are missing, then perhaps the data records have been intentionally tampered with and altered. Similarly, if only the electronic data 22 is present and its corresponding hash value 78 is missing, fraud may be present.

Figure 17:
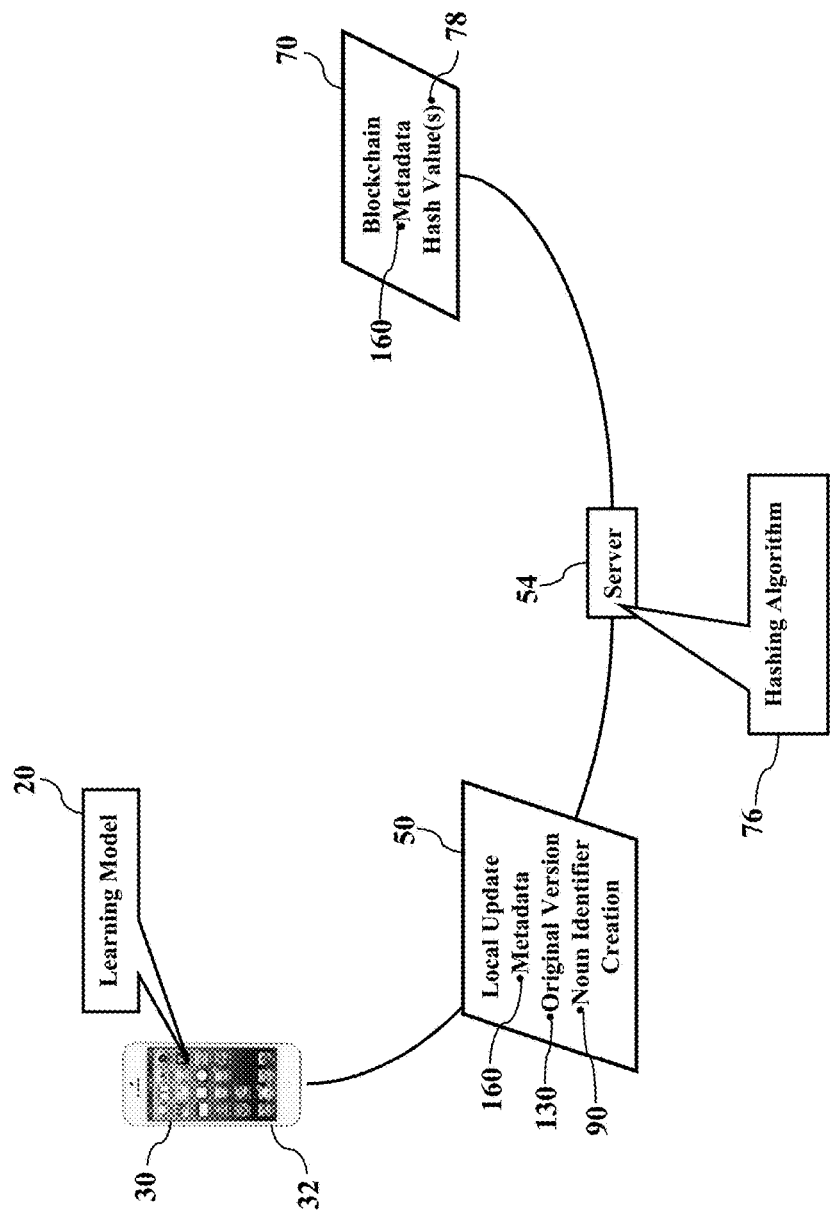
FIG. 17 illustrates metadata, according to exemplary embodiments.

FIG. 17 illustrates metadata 160, according to exemplary embodiments. Here exemplary embodiments may augment the local update 50 with the metadata 160. The metadata 160 may be any information that aids in documenting the local update 50, the learning model 20, the original version 130, and/or even the noun identifier 90 (e.g., the device identifier 58, the model identifier 98, and/or user identifier 100, as above explained). The metadata 160 may also describe any corresponding cryptographic hash value(s) 78. The metadata 160 may even describe software programming changes to the learning model 20, perhaps using keywords. The metadata 160 may describe the date and time of the creation 134 and/or an informational summary. The metadata 160 may also describe a location (such as GPS information at the creation 134, as determined by a GPS system). The metadata 160 may describe a formatting of the local update 50, structured data used or present within the local update 50, and even programming instructions. Exemplary embodiments may thus integrate the metadata 160, and/or its corresponding cryptographic hash values 78, into the blockchain 70.

Figure 18:
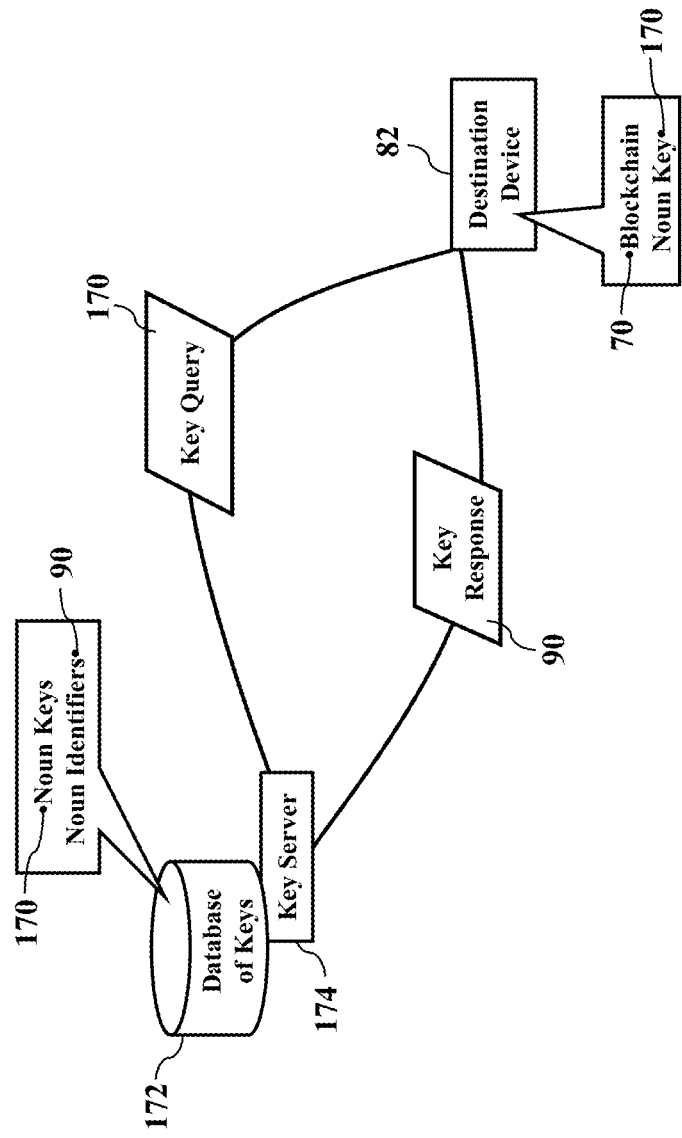
FIGS. 18-19 illustrate a noun key, according to exemplary embodiments.
Figure 19:
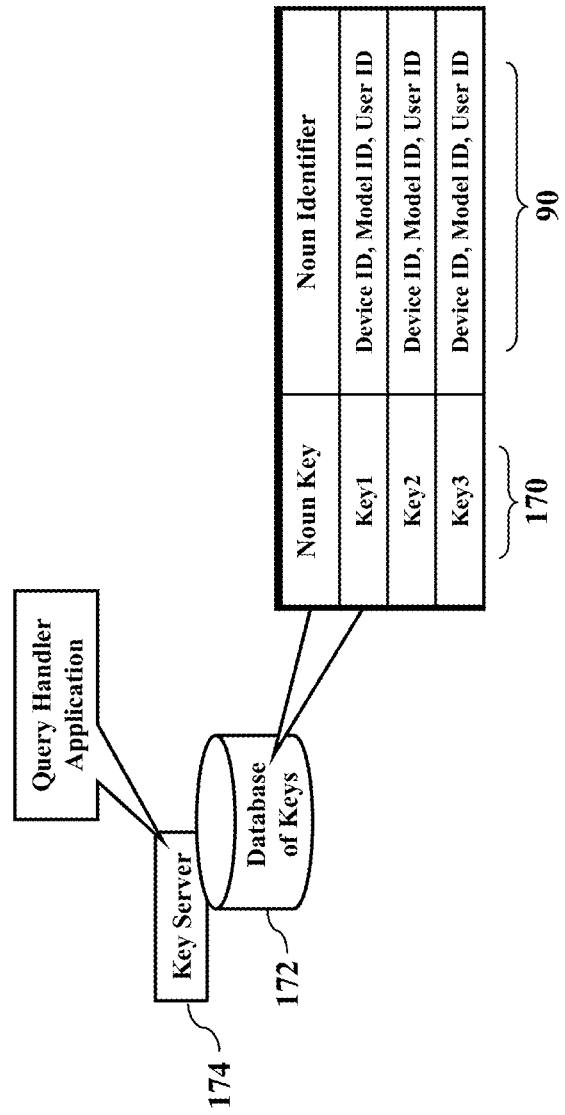
Figure 20:
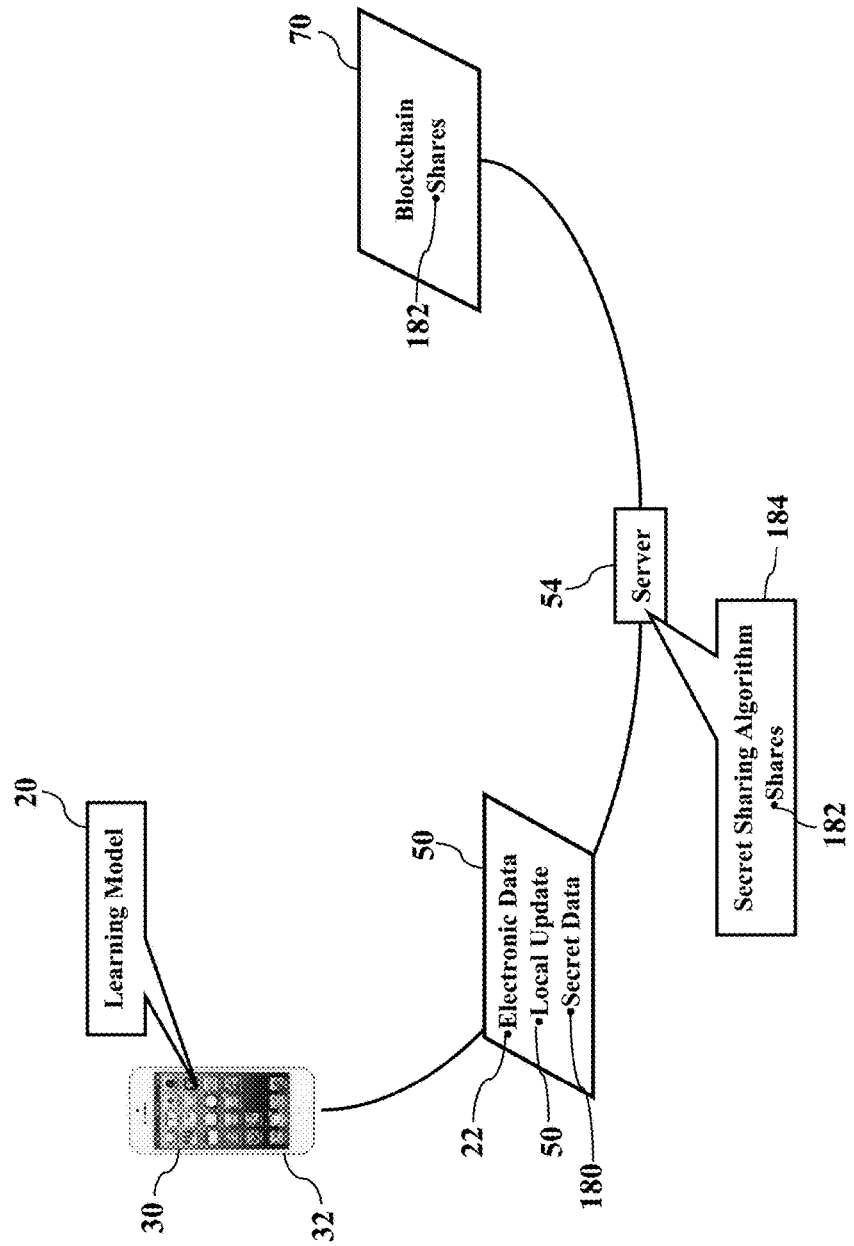
FIGS. 20-23 illustrate secret sharing, according to exemplary embodiments.

FIGS. 18-19 illustrate a noun key 170, according to exemplary embodiments. Once the noun identifier 90 (e.g., the device identifier 58, the model identifier 98, and/or the user identifier 100, as above explained) is determined and/or retrieved, the noun identifier 90 may be hashed using the cryptographic hashing algorithm 76 (as above explained) to generate one or more cryptographic noun keys 170. The cryptographic noun key 170 may then incorporated into and/or distributed via the blockchain 70. Once any recipient receives the blockchain 70, the recipient may reverse lookup the noun key 170 to retrieve the corresponding noun identifier 90. For example, the recipient device 82 may send a key query to a database 172 of keys. FIG. 18 illustrates a key server 174 locally storing the database 172 of keys in local memory. The database 172 of keys converts or translates the noun key 170 back into its corresponding noun identifier 90. FIG. 19 illustrates the database 172 of keys is illustrated as a table that electronically maps, relates, or associates different cryptographic noun keys 170 to different noun identifiers 90. The key server 174 identifies the corresponding noun identifier 90 and sends a key response. The key response, for example, identifies the device identifier 58, the model identifier 98, and/or the user identifier 100 as a source of the local update 50. Exemplary embodiments may thus identify the mobile device 30, the learning model 20, and the user associated with the local update 50.

FIGS. 20-23 illustrate secret sharing, according to exemplary embodiments. By now the reader understands that the electronic data 22 and/or the local update 50 may contain sensitive information (such as the user's personal and device information). The electronic data 22 and/or the local update 50, in plain words, may contain secret data 180. If the secret data 180 was to fall into the wrong hands, the secret data 180 may be nefariously used by a rogue entity.

Exemplary embodiments may thus protect the secret data 180. When the mobile device 30 generates the local update 50, exemplary embodiments may split the local update 50 into multiple pieces termed shares 182. The server 54, for example, may call or invoke a secret sharing algorithm 184 to generate the shares 182. The server 54 may then distribute one or more of the shares 182 via the blockchain 70.

Figure 21:
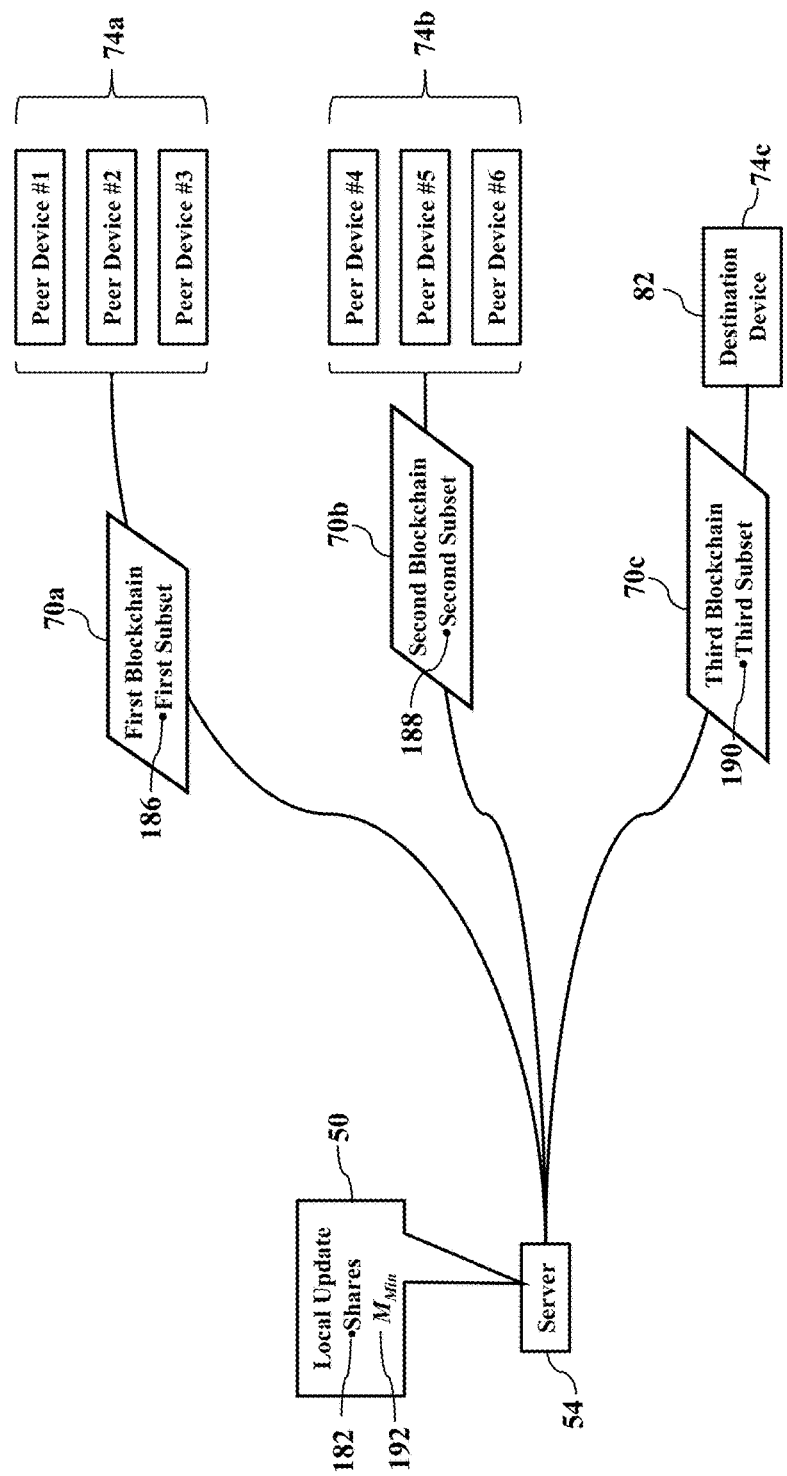

FIG. 21 further illustrates secret sharing. Here, though, the server 54 may integrate any one or more of the shares 182 into the multiple blockchains 70. While exemplary embodiments may utilize any number of different blockchains 70, FIG. 21 again illustrates the simple example of the three (3) blockchains 70a-c. The blockchains 70a-c may then be distributed to the same destination or to different destinations. That is, some of the shares 182 (such as a first subset 186) may be integrated into the first blockchain 70a and distributed (via the communications network 52 illustrated in FIGS. 2-4 and 10) to a first group 74a of peer devices. A second subset 188 of the shares 182 may be integrated into the second blockchain 70b and distributed to a second group 74b of peer devices. Still more shares 182 (such as the remaining portion or pieces in a third subset 190) may be integrated into the third blockchain 70c and distributed to a third group 74c of peer devices (such as any destination device 82). Different collections of the shares 182, in other words, may be distributed via different blockchains 70a-c to different destinations/devices.

Exemplary embodiments may thus stash the shares 182a in the multiple blockchains 70a-c. Because the local update 50 may be split into the multiple shares 182, any one or more recipient devices must possess a sufficient minimum number $M_{Min}$ (illustrated as reference numeral 192) of the shares 182 before the local update 50 may be recovered. That is, possession of an insufficient number of the shares 182 guarantees that the local update 50 remains unknown and confidential. In other words, no single one of the multiple blockchains 70a-c may store the requisite minimum number $M_{Min}$ 192 of the shares 182 to launch a brute-force attack on the local update 50. Even multiple ones of the blockchains 70a-c may be purposefully designed to never exceed the requisite minimum number $M_{Min}$ 192 of the shares 182, perhaps thus forcing a hacker to compromise several or all of the blockchains 70a-c. A rogue attack, in simple words, would have to access and compromise multiple blockchains 70 before jeopardizing the local update 50.

Exemplary embodiments thus present another elegant solution. The sensitive, secret local update 50 may be secretly shared via the one or more blockchains 70a-c. Even if the blockchains 70a-c are dispersed to trusted peer devices, the peer devices still cannot discern the local update 50 until the threshold minimum number $M_{Min}$ 192 of the shares 182 is obtained. Exemplary embodiments thus purposefully add a second-layer of protection, beyond merely trusted receipt of the blockchain 70. The trusted peers simply do not have access to the local update 50 until the minimum number $M_{Min}$ 192 of the shares 182 is obtained.

Any secret sharing scheme may be utilized. The reader is perhaps familiar with Shamir's Secret Sharing Algorithm, which is a well-known cryptographic algorithm. Exemplary embodiments may thus divide the local update 50 into unique parts (e.g., the shares 182), with each individual share 182 being different from other shares 182. However, there are many secret sharing or splitting schemes and algorithms for distributing a secret, and exemplary embodiments may be applied regardless of any particular scheme or algorithm.

Figure 22:
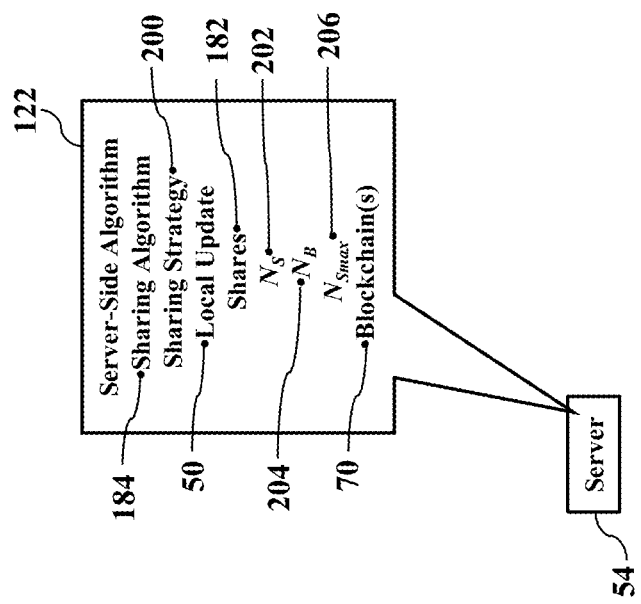

FIG. 22 illustrates a sharing strategy 200. Here exemplary embodiments may call the sharing algorithm 184 to retrieve and/or to implement the sharing strategy 200 that defines distribution via the multiple blockchains 70 to protect the local update 50. Suppose, for example, that the total number $N_S$ (illustrated as reference numeral 202) of the shares 182 defines a number $N_B$ (illustrated as reference numeral 204) of the different blockchains 70. The total number $N_S$ 202 of the shares 182, in other words, may relate by a ratio to the number $N_B$ 204 of blockchains 70 that must be used. As a simple example, the ratio may be $$\frac{N_S}{N_B} = 10,000,$$

where the total number $N_S$ 202 of the shares 182 is ten thousand (10,000) times the number $N_B$ 204 of blockchains 70 that must be used. Again, as a simple example, if the local update 50 is associated with one million (1,000,000) shares 182, then one hundred (100) different blockchains 70 must be generated and distributed. The sharing strategy 200, in other words, may set a maximum number $N_{Smax}$ (illustrated as reference numeral 206) of shares 182 integrated into any single blockchain 70. The sharing strategy 200, in other words, may thus limit the number of the shares 182 exposed by any individual blockchain 70.

Figure 23:
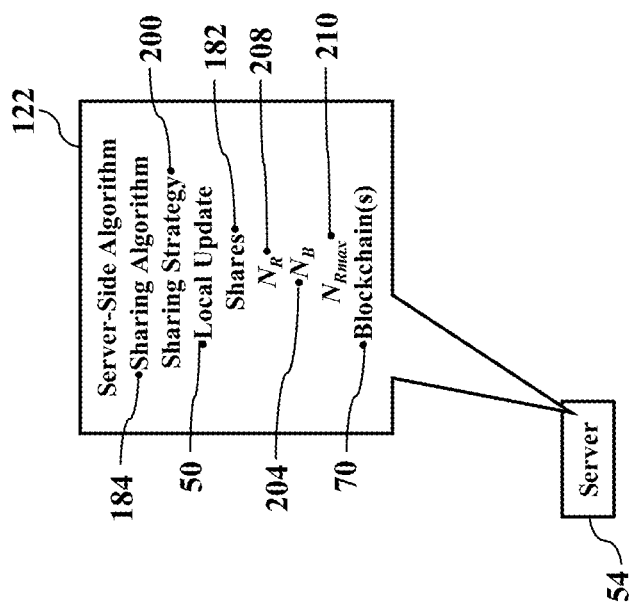

FIG. 23 further illustrates the sharing strategy 200. Here, though, the number $N_B$ 204 of blockchains may be based on the number of recipients. That is, the total number $N_R$ (illustrated as reference numeral 208) of the recipients may define the number $N_B$ 204 of the different blockchains 70. The greater the recipients, in other words, then the greater the $N_B$ 204 of blockchains 70 that must be used. Again, suppose that the sharing strategy 200 may again be defined as the ratio $$\frac{N_R}{N_B} = 100,$$

where the total number $N_R$ 208 of the recipients is one hundred (100) times the number $N_B$ 204 of blockchains 70 that must be used. Again, as a simple example, if there are ten thousand recipients, then one hundred (100) different blockchains 70 must be generated and distributed. The sharing strategy 200, in other words, may set a maximum number $N_{Rmax}$ (illustrated as reference numeral 210) of recipients per blockchain 70. The sharing strategy 200, in other words, may thus limit the number of the shares 182 exposed by any individual blockchain 70.

The sharing strategy 200 may be implemented as logical rules. If the sharing strategy 200 is mathematically defined (such as the ratio above discussed), the sharing strategy 200 may be expressed as logical statements involving mathematical expressions. Exemplary embodiments may code or program the sharing strategy 200 to achieve policy goals and/or security objectives.

Figure 24:
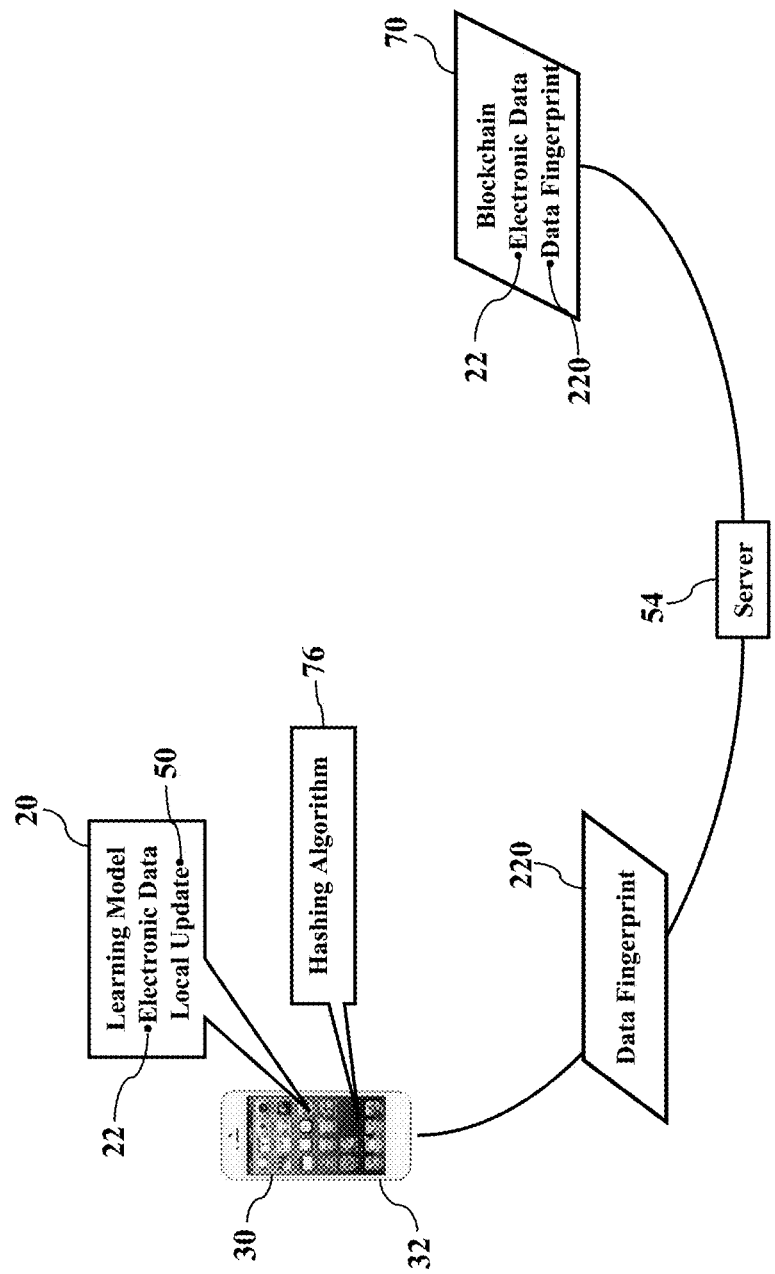
FIG. 24 illustrates fingerprinting, according to exemplary embodiments.

FIG. 24 illustrates fingerprinting, according to exemplary embodiments. Some users of the learning model 20 may be concerned about exposing their personal usage. That is, some users may not want the local update 50 to reveal some, any, or all of the raw electronic data 22 gathered by, or processed by, the learning model 20. Indeed, some federated learning models alieve privacy concerns by locally storing the raw electronic data 22 without exposure to the cloud/Internet. Exemplary embodiments may thus generate a data fingerprint 220 based on the raw electronic data 22 gathered by, or processed by, the learning model 20. The data fingerprint 220 may be incorporated into the local update 50, but the data fingerprint 220 may only reveal a subset of the electronic data 22 used by the learning model 20. For example, the learning model 20 may call and/or execute a fingerprinting module that generates the data fingerprint 220. The fingerprinting module may be a subroutine that applies a fingerprinting algorithm to the electronic data 22 used by the learning model 20. The fingerprinting module, additionally or alternatively, apply the fingerprinting algorithm to the local update 50. Regardless, the fingerprinting module generates and stores the data fingerprint 220 as a smaller, less bulky data file and/or a shorter bit string. The fingerprinting algorithm may also use data hashing (such as the hashing algorithm 76) to generate the data fingerprint 220. Regardless, the local update 50 may contain, or be representative of, the data fingerprint 220 based on the electronic data 22 used by the learning model 20. When the server 54 receives the data fingerprint 220, the server 54 may update the learning model 20 while alleviating privacy concerns.

The data fingerprint 220 also allows data reproducibility. Even though the data fingerprint 220 may be a much smaller file or shorter bit string (e.g., cryptographic key), the data fingerprint 220 is different from, and not the same, as the electronic data 22 used by the learning model 20. The data fingerprint 220 may thus guarantee, at the very least, that some of the electronic data 22 is reported to the server 54 for training the federated learning model 20. The data fingerprint 220 may also guarantee that none of the electronic data 22 is omitted from analysis. Exemplary embodiments may thus integrate the raw electronic data 22 and/or the data fingerprint 220 in the blockchain 70. Integrating both the electronic data 22 and the data fingerprint 220 allows a recipient of the blockchain 70 to both verify and reproduce the electronic data 22, based on the data fingerprint 220. A single API call, for example, may be used to retrieve the data fingerprint 220, perhaps with an additional payload as the electronic data 22.

Figure 25:
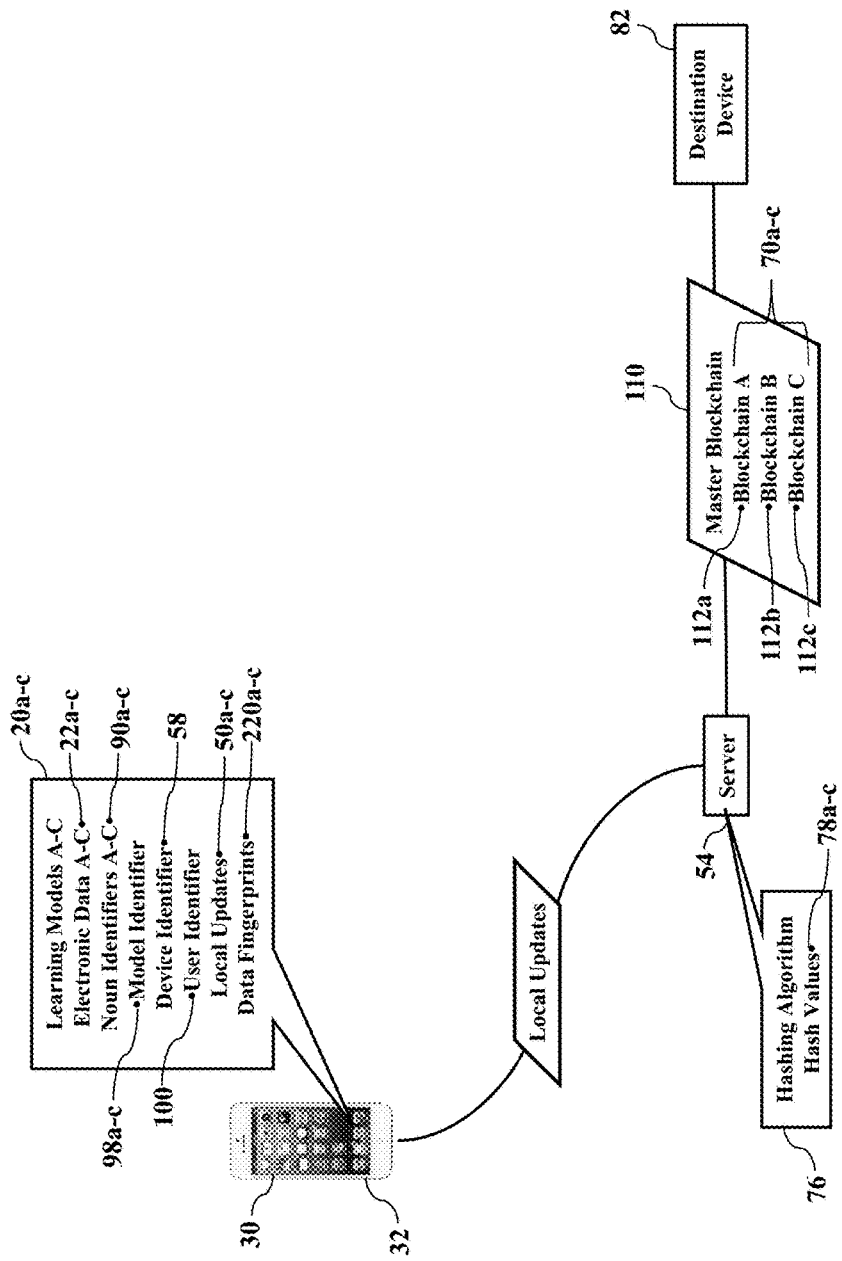
FIG. 25 further illustrates master chaining, according to exemplary embodiments.

FIG. 25 further illustrates master chaining, according to exemplary embodiments. Here the master blockchain 110 may be dedicated to a single device, a single user, and/or the single learning model 20. FIG. 25, for example, illustrates the master blockchain 110 dedicated to the mobile device 30 (again illustrated as the smartphone 32). That is, the master blockchain 110 may be associated with the device identifier 58 that uniquely identifies the smartphone 32. Because the smartphone 32 may store and execute the many different learning models 20a-c, the sub-blockchain 112a may be dedicated to the first learning model 20a. The sub-blockchain 112b may be dedicated to the second learning model 20b (such as a dating application). The sub-blockchain 112c may be dedicated to the third learning model 20c (such as a walking application). The sub-blockchains 112a-c may integrate their respective raw electronic data 22a-c, their respective local updates 50a-c, their respective data fingerprints 220a-c, and/or their respective cryptographic hash values 78a-c. The sub-blockchains 112a-c may also integrate their respective noun identifiers 90a-c. Because the master blockchain 110 is dedicated to the smartphone 32, the sub-blockchains 112a-c may have the common device identifier 58. If the learning models 20a-c have a common user, then the sub-blockchains 112a-c may have the common user identifier 100. For simplicity, FIG. 25 illustrates the smartphone 32 distributing or publishing the master blockchain 110 to the destination device 82. However, the master blockchain 110 may be sent or routed to any destination or recipient.

Exemplary embodiments may also include a central repository. Even though the master blockchain 110 may be used a publication and/or archival system, the server 54 may also act as a clearinghouse or central repository for all the activities conducted by the smartphone 32. That is, because there may be multiple blockchains 70 (as this disclosure explains), the server 54 may store any blockchain 70 in an electronic database. The electronic database may have entries that electronically map, relate, or associate the blockchain 70 to the corresponding noun identifier 90 (e.g., the device identifier 58, the model identifier 98, and/or user identifier 100). The electronic database may thus organize and/or group the data records contained within, or referenced by, the master blockchain 110 and/or the multiple sub-blockchains 112a-c according to the mobile device 30, the learning model 20, and/or the current user. The server 54 may thus receive queries from client devices specifying the noun identifier 90 and identify the corresponding data records distributed via the master blockchain 110 and/or the multiple sub-blockchains 112a-c. The server 54 may even send query responses to the client devices, and the query responses may specify or even include the corresponding data records. The server 54 may thus act as a historical repository for the activities conducted by the smartphone 32, the learning model 20, and/or the current user. The server may historically log the local update 50 (such as the data fingerprint 220) in the electronic database in electronic association with the noun identifier 90. Again, then, the server 54 may act as a historical repository for the activities conducted by the smartphone 32, the learning model 20, and/or the current user.

Figure 26:
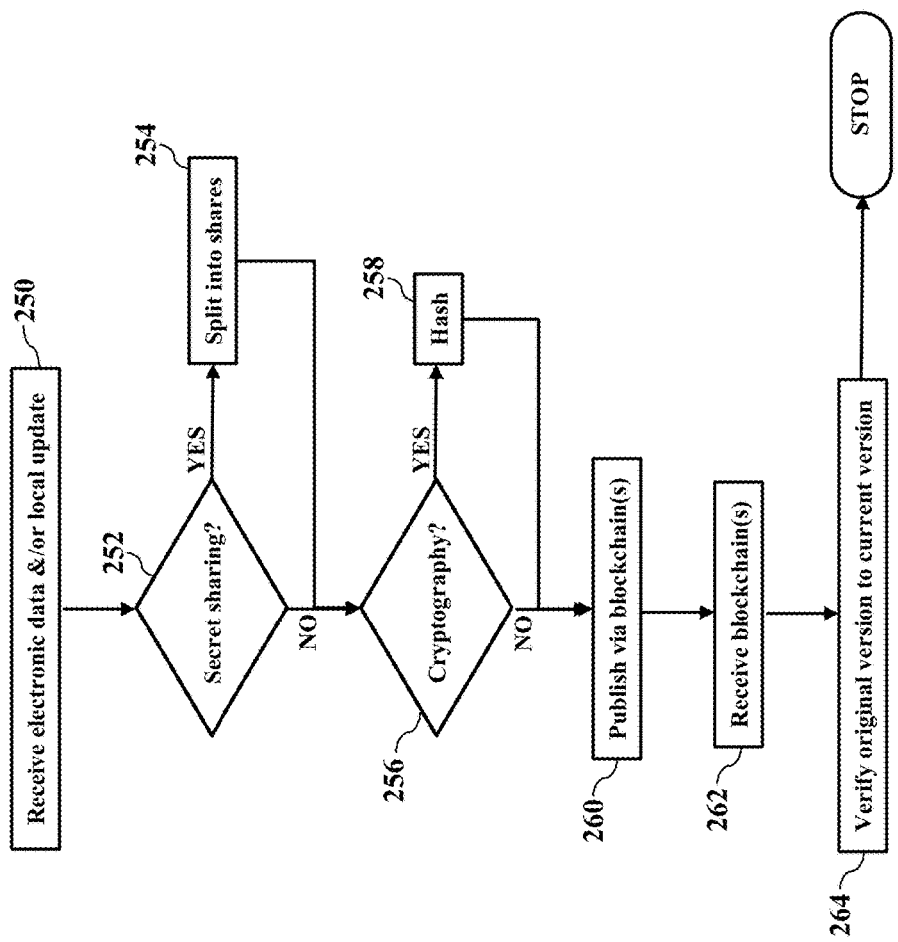
FIG. 26 is a flowchart illustrating a method or algorithm for reproductive federated learning, according to exemplary embodiments.

FIG. 26 is a flowchart illustrating a method or algorithm for reproductive federated learning, according to exemplary embodiments. The electronic data 22 and/or the local update 50 is reported to the server 54 (Block 250). If secret sharing is desired (Block 252), then the electronic data 22 and/or the local update 50 is split into the shares 182 (Block 254). If cryptography is desired (Block 256), then the electronic data 22, the local update 50, and/or the shares 182 are hashed using the cryptographic hashing algorithm 36 (Block 258). The blockchain(s) 70, 110, and/or 112 are published (Block 260). When a recipient receives the blockchain(s) 70, 110, and/or 112 (Block 262), the recipient may verify the original version 130 to the current version 132 (Block 264).

Figure 27:
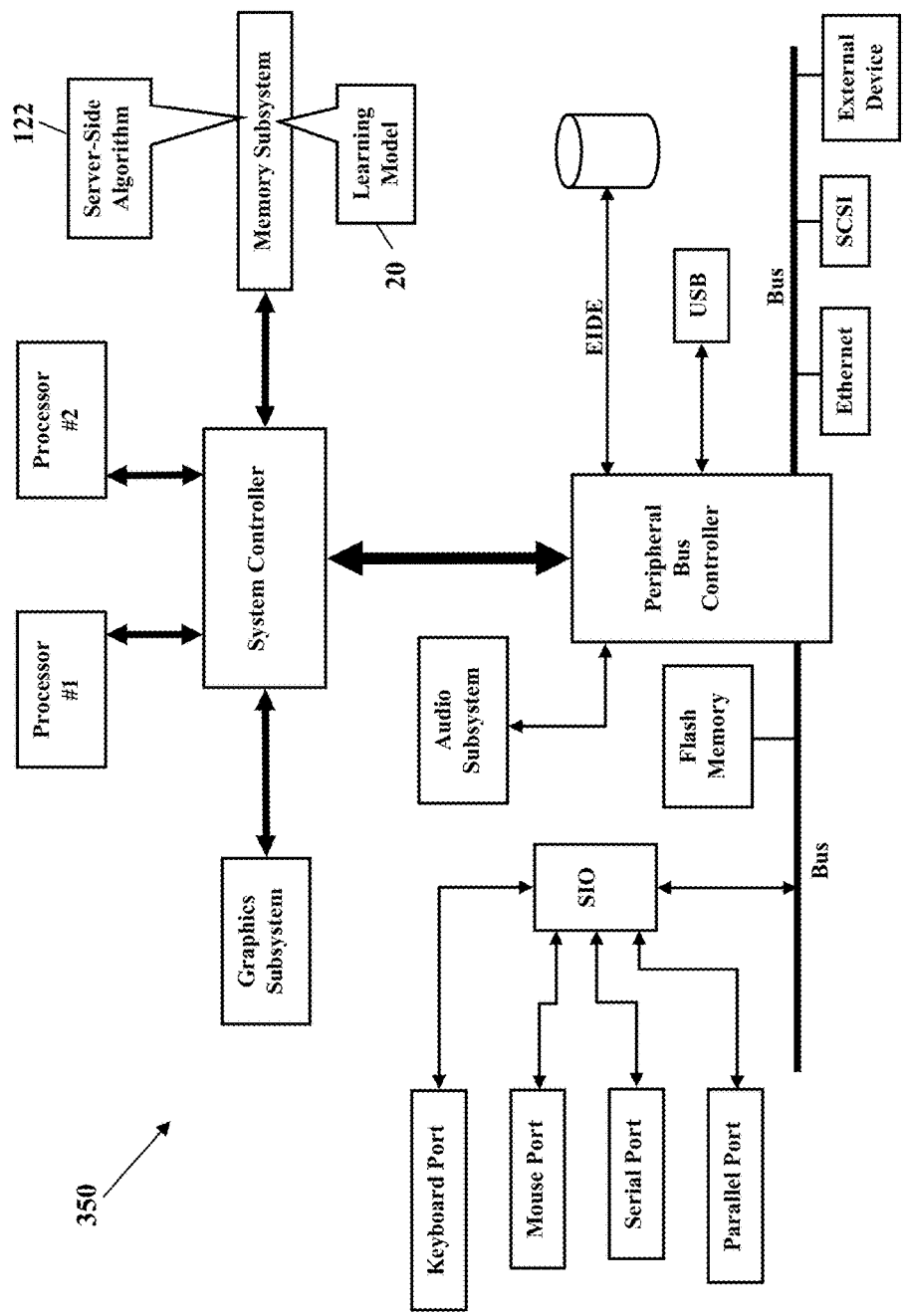
FIGS. 27-28 depict still more operating environments for additional aspects of the exemplary embodiments.

FIG. 27 is a schematic illustrating still more exemplary embodiments. FIG. 27 is a more detailed diagram illustrating a processor-controlled device 350. As earlier paragraphs explained, the learning model 20 and/or the server-side algorithm 122 may partially or entirely operate in any mobile or stationary processor-controlled device. FIG. 27, then, illustrates the learning model 20 and/or the server-side algorithm 122 stored in a memory subsystem of the processor-controlled device 350. One or more processors communicate with the memory subsystem and execute either, some, or all applications. Because the processor-controlled device 350 is well known to those of ordinary skill in the art, no further explanation is needed.

Figure 28:
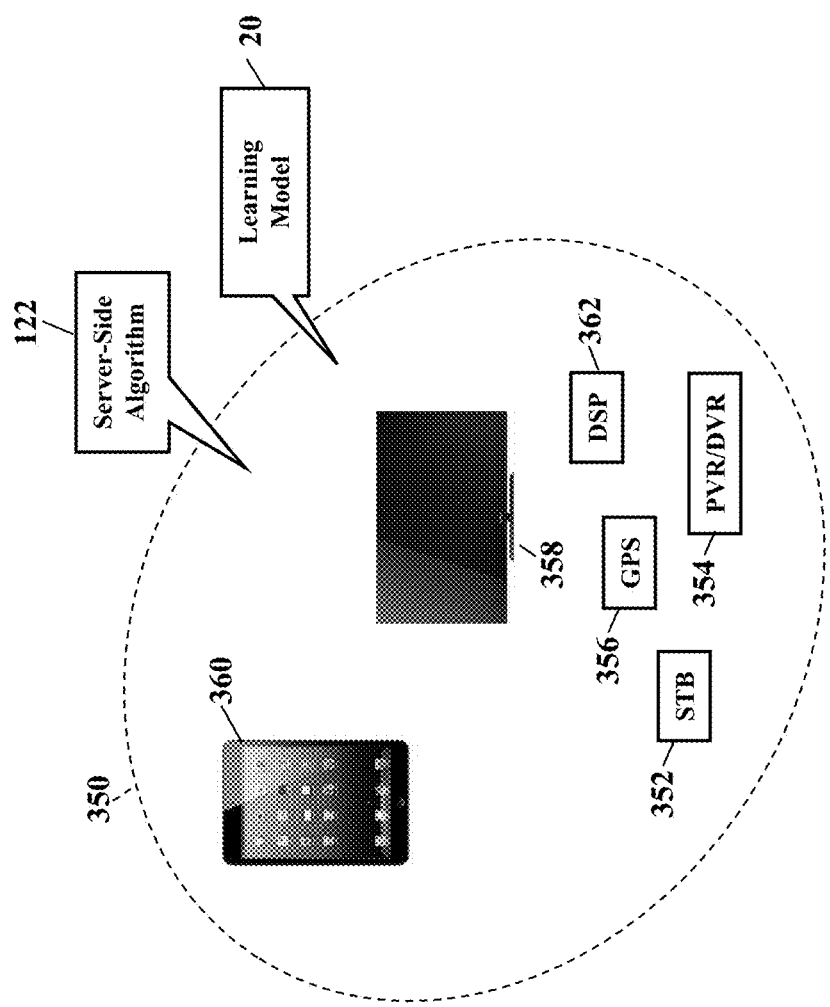

FIG. 28 depicts other possible operating environments for additional aspects of the exemplary embodiments. FIG. 28 illustrates the learning model 20 and/or the server-side algorithm 122 operating within various other processor-controlled devices 350. FIG. 28, for example, illustrates that the learning model 20 and/or the server-side algorithm 122 may entirely or partially operate within a set-top box ("STB") (352), a personal/digital video recorder (PVR/DVR) 354, a Global Positioning System (GPS) device 356, an interactive television 358, a tablet computer 360, or any computer system, communications device, or processor-controlled device utilizing any of the processors above described and/or a digital signal processor (DP/DSP) 362. Moreover, the processor-controlled device 350 may also include wearable devices (such as watches), radios, vehicle electronics, clocks, printers, gateways, mobile/implantable medical devices, and other apparatuses and systems. Because the architecture and operating principles of the various devices 350 are well known, the hardware and software componentry of the various devices 350 are not further shown and described.

Exemplary embodiments may be applied to any signaling standard. Most readers are thought familiar with the Global System for Mobile (GSM) communications signaling standard. Those of ordinary skill in the art, however, also recognize that exemplary embodiments are equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard. Exemplary embodiments may also be applied to other standards, such as the I.E.E.E. 802 family of standards, the Industrial, Scientific, and Medical band of the electromagnetic spectrum, BLUETOOTH®, and any other.

Exemplary embodiments may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for reproducing and/or verifying data in learning models, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A memory device storing instructions that when executed cause a hardware processor to perform operations, the operations comprising:
   receiving local updates sent from a mobile device, the local updates generated by a federated learning model executed by the mobile device;
   generating a learning modification to the federated learning model based on the local updates sent from the mobile device;
   splitting the local updates into multiple shares via a secret sharing algorithm;
   generating cryptographic hash values by hashing the multiple shares using a cryptographic hashing algorithm;
   determining a number $N_B$ of different blockchains for a distribution of the cryptographic hash values, the number $N_B$ of the different blockchains based on a total number $N_S$ of the multiple shares according to a ratio of $N_S/N_B$ having a maximum value;
   distributing the cryptographic hash values via the different blockchains, wherein the different blockchains comprise a master blockchain dedicated to the mobile device and a sub-blockchain dedicated to the federated learning model;
   retrieving verification hash values generated by the hashing of current versions of the local updates associated with the federated learning model using the cryptographic hashing algorithm;
   comparing the cryptographic hash values distributed via the different blockchains to the verification hash values generated by the hashing of the current versions of the local updates; and
   verifying that the current versions of the local updates are authentic in response to the verification hash values satisfying the cryptographic hash values distributed via the different blockchains.

2. The memory device of claim 1, wherein the operations further comprise determining a ratio $N_S/N_B$ based on the number $N_B$ of the different blockchains and a total number $N_S$ of the multiple shares split via the secret sharing algorithm.

3. The memory device of claim 1, wherein the operations further comprise determining a number $N_R$ of recipients of the different blockchains.

4. The memory device of claim 3, wherein the operations further comprise determining the number $N_B$ of the different blockchains based on the number $N_R$ of recipients of the different blockchains according to a ratio of $N_R/N_B$ having a maximum value.

5. A system, comprising:
   a hardware processor; and
   a memory device, the memory device storing instructions, the instructions when executed causing the hardware processor to perform operations, the operations comprising:
   receiving local updates generated by a federated learning model executed by a mobile device;
   generating a learning modification to the federated learning model based on the local updates;
   splitting the local updates into multiple shares via a secret sharing algorithm;
   generating cryptographic hash values by hashing the multiple shares using a cryptographic hashing algorithm;
   determining a number $N_B$ of different blockchains for a distribution of the cryptographic hash values, the number $N_B$ of the different blockchains based on a total number $N_S$ of the multiple shares according to a ratio of $N_S/N_B$ having a maximum value;
   distributing the cryptographic hash values via a master blockchain of the different blockchains dedicated to the mobile device and via a sub-blockchain of the different blockchains dedicated to the federated learning model;
   retrieving verification hash values generated by the hashing of current versions of the local updates associated with the federated learning model using the cryptographic hashing algorithm;
   comparing the cryptographic hash values distributed via the different blockchains to the verification hash values generated by the hashing of the current versions of the local updates; and
   verifying that the current versions of the local updates are authentic in response to the verification hash values satisfying the cryptographic hash values distributed via the different blockchains.

6. The system of claim 5, wherein the operations further comprise determining a number $N_R$ of recipients of the different blockchains.

7. The system of claim 5, wherein the operations further comprise determining the number $N_B$ of the different blockchains based on the number $N_R$ of recipients of the different blockchains according to a ratio of $N_R/N_B$ having a maximum value.

8. The system of claim 5, wherein the operations further comprise determining that the current versions of the local updates are inauthentic in response to the verification hash values failing to satisfy the cryptographic hash values.

9. The system of claim 5, wherein the operations further comprise receiving a noun identifier that identifies the federated learning model.

10. The system of claim 5, wherein the operations further comprise receiving a noun identifier that identifies the mobile device.

11. A method, comprising:
receiving, by a server, local updates sent from a mobile device, the local updates generated by a federated learning model executed by the mobile device;
generating, by the server, a learning modification to the federated learning model based on the local updates sent from the mobile device;
splitting, by the server, the local updates into multiple shares via a secret sharing algorithm;
generating, by the server, cryptographic hash values by hashing the multiple shares using a cryptographic hashing algorithm;
determining, by the server, a number $N_B$ of different blockchains for a distribution of the cryptographic hash values, the number $N_B$ of the different blockchains based on a total number $N_S$ of the multiple shares according to a ratio of $N_S/N_B$ having a maximum value;
distributing, by the server, the cryptographic hash values via a master blockchain of the different blockchains dedicated to the mobile device and via a sub-blockchain of the different blockchains dedicated to the federated learning model;
retrieving, by the server, verification hash values generated by the hashing of current versions of the local updates associated with the federated learning model using the cryptographic hashing algorithm;
comparing, by the server, the cryptographic hash values to the verification hash values generated by the hashing of the current versions of the local updates; and
verifying, by the server, that the current versions of the local updates are authentic in response to the verification hash values satisfying the cryptographic hash values.

12. The method of claim 11, further comprising determining a number $N_R$ of recipients of the different blockchains.

13. The method of claim 12, further comprising determining the number $N_B$ of the different blockchains based on the number $N_R$ of recipients of the different blockchains according to a ratio of $N_R/N_B$.

14. The method of claim 11, further comprising determining that the current versions of the local updates are inauthentic in response to the verification hash values failing to satisfy the cryptographic hash values.

15. The method of claim 11, further comprising receiving a noun identifier that identifies the federated learning model.

16. The method of claim 11, further comprising receiving a noun identifier that identifies the mobile device.

* * * * *